(12) United States Patent
Liu et al.

(10) Patent No.: US 11,108,533 B2
(45) Date of Patent: Aug. 31, 2021

(54) DATA PROCESSING METHOD, BASE STATION, AND RECEIVING DEVICE

(71) Applicant: HUAWEI TECHNOLOGIES CO., LTD., Shenzhen (CN)

(72) Inventors: Kunpeng Liu, Beijing (CN); Xueru Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 16/584,954

(22) Filed: Sep. 27, 2019

(65) Prior Publication Data
US 2020/0036503 A1 Jan. 30, 2020

Related U.S. Application Data

(63) Continuation of application No. PCT/CN2018/081566, filed on Apr. 2, 2018.

(30) Foreign Application Priority Data

Apr. 5, 2017 (CN) .......................... 201710217475.X

(51) Int. Cl.
*H04L 27/26* (2006.01)
*H04L 5/10* (2006.01)
(Continued)

(52) U.S. Cl.
CPC .............. *H04L 5/10* (2013.01); *H04L 1/0003* (2013.01); *H04L 5/0007* (2013.01); *H04L 5/0051* (2013.01); *H04L 27/2613* (2013.01)

(58) Field of Classification Search
CPC ....... H04L 5/10; H04L 5/0007; H04L 5/0051; H04L 1/0003; H04L 27/2613; H04W 72/042; H04W 24/10
See application file for complete search history.

(56) References Cited

U.S. PATENT DOCUMENTS

| 2007/0097915 A1 | 5/2007 | Papasakellariou |
| 2012/0243511 A1 | 9/2012 | Lv et al. |

(Continued)

FOREIGN PATENT DOCUMENTS

| CN | 102013938 A | 4/2011 |
| CN | 105024781 A | 11/2015 |
| CN | 106465354 A | 2/2017 |

OTHER PUBLICATIONS

Mitsubishi Electric: "DMRS designs for NR MIMO",3GPP Draft; R1-1705814, Apr. 2, 2017,total 12 pages.

(Continued)

*Primary Examiner* — Wei Zhao
(74) *Attorney, Agent, or Firm* — Maier & Maier, PLLC

(57) ABSTRACT

Methods, base station, and receiving device are provided to advance a decoding time of a second codeword. The method performed by a base station includes obtaining a demodulation pilot pattern (DPP) in a transmission time unit, the DPP includes a first DPP of a first codeword and a second DPP of a second codeword; the first DPP indicates a time-frequency resource of each OFDM symbol in a first set, and the second DPP indicates a time-frequency resource of each OFDM symbol in a second set; and an MCS indication value of the first codeword is greater than an MCS indication value of the second codeword; and mapping a pilot signal to a time-frequency resource based on the DPP, and sending the pilot signal, a transmission time of a first OFDM symbol in the first set is before a transmission time of a first OFDM symbol in the second set.

20 Claims, 16 Drawing Sheets

(a)

(b)

(51) Int. Cl.
  *H04L 1/00*    (2006.01)
  *H04L 5/00*    (2006.01)

(56) References Cited

U.S. PATENT DOCUMENTS

| | | | |
|---|---|---|---|
| 2014/0086168 A1* | 3/2014 | Bao | H04L 5/0096 370/329 |
| 2017/0141903 A1 | 5/2017 | Xu et al. | |
| 2018/0014048 A1* | 1/2018 | Moon | H04N 21/41407 |
| 2019/0349904 A1* | 11/2019 | Kwak | H04W 72/042 |

OTHER PUBLICATIONS

LG Electronics: "NR PBCH Design",3GPP Draft; R1-1704865, 2-Apr. 1, 2017,total 16 pages.

* cited by examiner

DATA PROCESSING METHOD, BASE STATION, AND RECEIVING DEVICE

CROSS-REFERENCE TO RELATED APPLICATIONS

This application is a continuation of International Application No. PCT/CN2018/081566, filed on Apr. 2, 2018, which claims priority to Chinese Patent Application No. 201710217475.X, filed on Apr. 5, 2017. The disclosures of the aforementioned applications are hereby incorporated by reference in their entireties.

TECHNICAL FIELD

This application relates to the communications field, and in particular, to a data processing method, a base station, and a receiving device.

BACKGROUND

In a communication process, a demodulation reference signal (DMRS) of service data and the service data are simultaneously sent, and are located in a same time-frequency resource range. Data at each layer has a corresponding DMRS port when a base station transmits data at a plurality of layers on a same time-frequency resource. Same precoding is performed on a DMRS on a DMRS port of data at each layer and the data at the layer. Therefore, channel estimation may be performed by using the DMRS of the data at the layer. A channel through which the data at the layer is transmitted is used to demodulate and decode the data at the layer. When the base station simultaneously transmits the data at the plurality of layers, code division multiplexing is performed on a plurality of DMRS ports by using an orthogonal code (also referred to as Orthogonal Cover Code or OCC) in the frequency domain and/or the time domain. In this way, the base station may simultaneously carry demodulation reference signals on a plurality of ports in the same time-frequency resource while not causing interference between different ports, thereby greatly reducing DMRS overheads, and in addition, the base station may perform code division multiplexing in frequency domain, so that a spread spectrum gain is obtained to further improve channel estimation performance.

In the prior art, when a base station simultaneously transmits a plurality of codewords, DMRS ports of codewords occupy a same orthogonal frequency division multiplexing (OFDM) symbol, and on the occupied OFDM symbol, the DMRS ports of the codewords occupy a same time-frequency resource element (RE), in other words, the DMRS ports of the codewords occupy a same time-frequency resource. In addition, DMRS ports of the plurality of codewords have a same frequency domain density on the occupied OFDM symbol. A frequency domain density refers to a quantity of REs occupied by a DMRS port on each physical resource block (PRB).

In a decoding process, a terminal device needs to decode a first codeword and a second codeword after receiving DMRSs of the two codewords. The terminal device first decodes the first codeword, and the terminal device can decode the second codeword only after decoding the first codeword. In addition, the second codeword needs to be decoded based on a decoding result of the first codeword. In the prior art, DMRS ports of the two codewords occupy a same time-frequency resource. Therefore, a delay of data decoding is large due to a relatively large delay at which the second codeword starts to be decoded.

SUMMARY

Embodiments of this disclosure provide a data processing method, a base station, and a receiving device, to effectively advance a decoding time of a second codeword and speed up decoding.

According to a first aspect, an embodiment of this disclosure provides a data processing method performed by a base station. The method includes:

before transmitting a pilot signal, obtaining, by the base station, a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each OFDM symbol in a first set, and the second demodulation pilot pattern indicates a time-frequency resource of each OFDM symbol in a second set; and a modulation and coding scheme (MCS) indication value of the first codeword is greater than an MCS indication value of the second codeword; and then mapping, by the base station, the pilot signal to a time-frequency resource based on the demodulation pilot pattern, and finally, sending, by the base station, the pilot signal, where when the base station sends the time-frequency resource, a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

In the technical solution provided in this embodiment of this disclosure, the first demodulation pilot pattern of the first codeword is a demodulation pilot pattern of a DRMS of the first codeword, and the second demodulation pilot pattern of the second codeword is a demodulation pilot pattern of a DRMS of the second codeword. In addition, the transmission time unit is a subframe in which the base station sends the pilot signal.

In the technical solution provided in this embodiment of this disclosure, when the base station sends the pilot signal by using the time-frequency resource, the transmission time of the first OFDM symbol in the first set is before the transmission time of the first OFDM symbol in the second set. Specifically, in an entire pilot signal transmission process, a receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

In an embodiment, a quantity of time-frequency resource elements (REs) on the first OFDM symbol in the first set indicated by the first demodulation pilot pattern is greater than a quantity of REs on the first OFDM symbol in the second set indicated by the second demodulation pilot pattern.

In the technical solution provided in this embodiment of this disclosure, a quantity of REs on each OFDM symbol in the first set indicated by the first demodulation pilot pattern of the first codeword is greater than a quantity of REs of the second demodulation pilot pattern of the second codeword on each corresponding OFDM symbol in the second set. For example, a quantity of REs of the first demodulation pilot pattern on a second OFDM symbol in the first set is greater than a quantity of REs of the second demodulation pilot pattern on a second OFDM symbol in the second set. Similarly, a quantity of REs of the first demodulation pilot pattern on a third OFDM symbol in the first set is greater than a quantity of REs of the second demodulation pilot pattern on a third OFDM symbol in the second set, and the like.

In the technical solution provided in this embodiment of this disclosure, because the MCS indication value of the first codeword is relatively large, if the demodulation pilot pattern of the first codeword occupies more REs (in other words, a frequency domain density is relatively high), accuracy of channel estimation for the first codeword is improved, a decoding success rate of the first codeword is improved, and a decoding success rate of the second codeword is improved. In addition, while the decoding success rates of the first codeword and the second codeword are ensured, time-frequency resource overheads of the demodulation pilot pattern can be reduced if the demodulation pilot pattern of the second codeword occupies fewer REs.

In an embodiment, a quantity of REs on at least one OFDM symbol in the first set indicated by the first demodulation pilot pattern is less than a quantity of REs on the first OFDM symbol in the first set indicated by the first demodulation pilot pattern.

In this embodiment, quantities of REs on OFDM symbols in the first set indicated by the first demodulation pilot pattern may successively decrease in an order of time domain locations from front to back that are of the OFDM symbols in the first set. For example, if the first set includes two OFDM symbols, a quantity of REs on a second OFDM symbol in the first set indicated by the first demodulation pilot pattern is less than a quantity of REs on a first OFDM symbol in the first set indicated by the first demodulation pilot pattern. If the first set includes three OFDM symbols, a quantity of REs on a second OFDM symbol in the first set indicated by the first demodulation pilot pattern is less than a quantity of REs on a first OFDM symbol in the first set indicated by the first demodulation pilot pattern, and then a quantity of REs on a third OFDM symbol in the first set indicated by the first demodulation pilot pattern is less than the quantity of REs on the second OFDM symbol in the first set indicated by the first demodulation pilot pattern. In addition, only the quantities of REs on the OFDM symbols in the first set indicated by the first demodulation pilot pattern may be less than the quantity of REs on the first OFDM symbol in the first set indicated by the first demodulation pilot pattern. A specific setting manner is not limited herein.

In the technical solution provided in this disclosure, time-frequency resource overheads of the demodulation pilot pattern can be reduced to a greatest extent when correct decoding of the first codeword is ensured.

In an embodiment, an RE set on the at least one OFDM symbol in the first set is a proper subset of an RE set on the first OFDM symbol in the first set. Alternatively, an intersection of an RE set on the at least one OFDM symbol in the first set and an RE set on the first OFDM symbol in the first set is an empty set.

In actual applications, an RE occupied on each OFDM symbol in the first set indicated by the first demodulation pilot pattern is not empty. In addition, an RE set on each OFDM symbol in the first set indicated by the first demodulation pilot pattern may be a proper subset of an RE set on the first OFDM symbol in the first set indicated by the first demodulation pilot pattern or an intersection of an RE set on each OFDM symbol in the first set indicated by the first demodulation pilot pattern and an RE set on the first OFDM symbol in the first set indicated by the first demodulation pilot pattern is an empty set. For example, if the first set includes two OFDM symbols, an RE set on a second OFDM symbol in the first set indicated by the first demodulation pilot pattern is a proper subset of an RE set on a first OFDM symbol in the first set indicated by the first demodulation pilot pattern. If the first set includes three OFDM symbols, an RE set on a second OFDM symbol in the first set indicated by the first demodulation pilot pattern is a proper subset of an RE set on a first OFDM symbol in the first set indicated by the first demodulation pilot pattern, and then an RE set on a third OFDM symbol in the first set indicated by the first demodulation pilot pattern is a proper subset of the RE set on the first OFDM symbol in the first set indicated by the first demodulation pilot pattern. Alternatively, if the first set includes two OFDM symbols, an intersection of an RE set on a second OFDM symbol in the first set indicated by the first demodulation pilot pattern and an RE set on a first OFDM symbol in the first set indicated by the first demodulation pilot pattern is an empty set. If the first set includes three OFDM symbols, an intersection of an RE set on a second OFDM symbol in the first set indicated by the first demodulation pilot pattern and an RE set on a first OFDM symbol in the first set indicated by the first demodulation pilot pattern is an empty set, and then an intersection of an RE set on a third OFDM symbol in the first set indicated by the first demodulation pilot pattern and the RE set on the first OFDM symbol in the first set indicated by the first demodulation pilot pattern is an empty set.

In the technical solution provided in this disclosure, that frequency domain locations of REs on OFDM symbols in the first set indicated by the first demodulation pilot pattern are consistent is applicable to a case in which channel frequency selectivity is relatively low. Therefore, complexity of performing channel interpolation by a receiving device can be reduced if the frequency domain locations of the REs on the OFDM symbols are consistent. However, that the frequency domain locations of the REs on the OFDM symbols in the first set indicated by the first demodulation pilot pattern are differentially arranged is applicable to a case in which channel frequency selectivity is relatively high. In this case, it can be ensured that the receiving device performs channel estimation at as many frequency domain locations as possible, to provide a more accurate frequency domain interpolation result, thereby improving channel estimation accuracy.

In an embodiment, in the second demodulation pilot pattern, a quantity of REs on at least one OFDM symbol in the second set indicated by the second demodulation pilot pattern is less than a quantity of REs on the first OFDM symbol indicated by the second demodulation pilot pattern.

In this embodiment, quantities of REs on OFDM symbols in the second set indicated by the second demodulation pilot pattern may successively decrease in an order of time domain locations from front to back that are of the OFDM symbols in the second set. For example, if the second set includes two OFDM symbols, a quantity of REs on a second OFDM symbol in the second set indicated by the second demodulation pilot pattern is less than a quantity of REs on a first OFDM symbol in the second set indicated by the second demodulation pilot pattern. If the second set includes three OFDM symbols, a quantity of REs on a second OFDM symbol in the second set indicated by the second demodulation pilot pattern is less than a quantity of REs on a first OFDM symbol in the second set indicated by the first demodulation pilot pattern, and then a quantity of REs on a third OFDM symbol in the second set indicated by the second demodulation pilot pattern is less than the quantity of REs on the second OFDM symbol in the second set indicated by the second demodulation pilot pattern. In addition, only the quantities of REs on the OFDM symbols in the second set indicated by the second demodulation pilot pattern may be less than the quantity of REs on the first OFDM symbol in the second set indicated by the second demodulation pilot pattern. A specific setting manner is not limited herein.

In the technical solution provided in this disclosure, time-frequency resource overheads of the demodulation pilot pattern can be reduced to a greatest extent when correct decoding of the second codeword is ensured.

In an embodiment, in the second demodulation pilot pattern, an RE set on the at least one OFDM symbol in the second set indicated by the second demodulation pilot pattern is a proper subset of an RE set on the first OFDM symbol in the second set indicated by the second demodulation pilot pattern. Alternatively, an intersection of an RE set on the at least one OFDM symbol in the second set indicated by the second demodulation pilot pattern and an RE set occupied on the first OFDM symbol in the second set indicated by the second demodulation pilot pattern is an empty set.

In actual applications, an RE on each OFDM symbol in the second set indicated by the second demodulation pilot pattern is not empty. In addition, an RE set on each OFDM symbol in the second set indicated by the second demodulation pilot pattern may be a proper subset of an RE set on the first OFDM symbol in the second set indicated by the second demodulation pilot pattern or an intersection of an RE set on each OFDM symbol in the second set indicated by the second demodulation pilot pattern and an RE set on the first OFDM symbol in the second set indicated by the second demodulation pilot pattern is an empty set. For example, if the second set includes two OFDM symbols, an RE set on a second OFDM symbol in the second set indicated by the second demodulation pilot pattern is a proper subset of an RE set on a first OFDM symbol in the second set indicated by the second demodulation pilot pattern. If the second set includes three OFDM symbols, an RE set on a second OFDM symbol in the second set indicated by the second demodulation pilot pattern is a proper subset of an RE set on a first OFDM symbol in the second set indicated by the second demodulation pilot pattern, and then an RE set on a third OFDM symbol in the second set indicated by the second demodulation pilot pattern is a proper subset of the RE set on the first OFDM symbol in the second set indicated by the second demodulation pilot pattern. Alternatively, if the second set includes two OFDM symbols, an intersection of an RE set on a second OFDM symbol in the second set indicated by the second demodulation pilot pattern and an RE set on a first OFDM symbol in the second set indicated by the second demodulation pilot pattern is an empty set. If the second set includes three OFDM symbols, an intersection of an RE set on a second OFDM symbol in the second set indicated by the second demodulation pilot pattern and an RE set on a first OFDM symbol in the second set indicated by the second demodulation pilot pattern is an empty set, and then an intersection of an RE set on a third OFDM symbol in the second set indicated by the second demodulation pilot pattern and the RE set on the first OFDM symbol in the second set indicated by the second demodulation pilot pattern is an empty set.

In the technical solution provided in this disclosure, that frequency domain locations of REs on OFDM symbols in the second set indicated by the second demodulation pilot pattern are consistent is applicable to a case in which channel frequency selectivity is relatively low. Therefore, complexity of performing channel interpolation by a receiving device can be reduced if the frequency domain locations of the REs on the OFDM symbols are consistent. However, that the frequency domain locations of the REs on the OFDM symbols in the second set indicated by the second demodulation pilot pattern are differentially arranged is applicable to a case in which channel frequency selectivity is relatively high. In this case, it can be ensured that the receiving device performs channel estimation at as many frequency domain locations as possible, to provide a more accurate frequency domain interpolation result, thereby improving channel estimation accuracy.

In an embodiment, in the second demodulation pilot pattern, a quantity of REs of the second demodulation pilot pattern on at least one OFDM symbol in the second set is greater than a quantity of REs of the second demodulation pilot pattern on the first OFDM symbol in the second set.

In this embodiment, quantities of REs on OFDM symbols in the first set indicated by the second demodulation pilot pattern may successively increase in an order of time domain locations from front to back that are of the OFDM symbols in the second set. For example, if the second set includes two OFDM symbols, a quantity of REs on a second OFDM symbol in the second set indicated by the second demodulation pilot pattern is greater than a quantity of REs on a first OFDM symbol in the second set indicated by the second demodulation pilot pattern. If the second set includes three OFDM symbols, a quantity of REs on a second OFDM symbol in the second set indicated by the second demodulation pilot pattern is greater than a quantity of REs on a first OFDM symbol in the second set indicated by the second demodulation pilot pattern, and then a quantity of REs on a third OFDM symbol in the second set indicated by the second demodulation pilot pattern is greater than the quantity of REs on the second OFDM symbol in the second set indicated by the second demodulation pilot pattern. In addition, only the quantities of REs on the OFDM symbols in the second set indicated by the second demodulation pilot pattern may be greater than the quantity of REs on the first OFDM symbol in the second set indicated by the second demodulation pilot pattern. A specific setting manner is not limited herein.

In the technical solution provided in this disclosure, decoding correctness of the second codeword can be improved. For example, if the second codeword is divided into a plurality of code blocks (Code Block) for transmission, when the second codeword is retransmitted, if only a code block of the second codeword is retransmitted on an OFDM symbol that is the same as or adjacent to that on which the code block is initially transmitted, decoding correctness of the retransmitted code block can be improved in the technical solution provided in this disclosure.

In an embodiment, the base station may further send pilot configuration information, where the pilot configuration information is used to indicate that in the second set, quantities of REs on OFDM symbols indicated by the second demodulation pilot pattern increase or decrease in ascending order of transmission times of the OFDM symbols in the second set.

In the technical solution provided in this disclosure, a receiving device can receive a pilot signal in a correct demodulation pilot pattern.

In an embodiment, frequency domain code division multiplexing is performed on each OFDM symbol in the first set by using an orthogonal code with a length of 4; and frequency domain code division multiplexing is performed on each OFDM symbol in the second set by using an orthogonal code with a length of 4.

In the technical solution provided in this disclosure, frequency domain code division multiplexing is performed on each OFDM symbol in each of the first set and the second set by using an orthogonal code with a length of 4, so that a quantity of users performing multiplexing can be effectively increased, or a quantity of layers at which a single user can simultaneously transmit data is increased.

According to a second aspect, an embodiment of this disclosure provides a data processing method. The method includes:

obtaining, by a receiving device, a demodulation pilot pattern in a transmission time unit, the demodulation pilot pattern includes a first demodulation pilot pattern of a first codeword and a second demodulation pilot pattern of a second codeword; the first demodulation pilot pattern indicates a time-frequency resource of each OFDM symbol in a first set, and the second demodulation pilot pattern indicates a time-frequency resource of each OFDM symbol in a second set; and a modulation and coding MCS indication value of the first codeword is greater than an MCS indication value of the second codeword; and receiving, by the receiving device, a pilot signal based on the demodulation pilot pattern, where the pilot signal is sent by a base station after being mapped by the base station to a time-frequency resource based on the demodulation pilot map; and when the base station sends the time-frequency resource, a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

In the technical solution provided in this embodiment of this disclosure, when the base station sends the pilot signal by using the time-frequency resource, the transmission time of the first OFDM symbol in the first set is before the transmission time of the first OFDM symbol in the second set. Specifically, in an entire pilot signal transmission process, the receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

In an embodiment, a quantity of time-frequency resource elements (REs) on the first OFDM symbol in the first set indicated by the first demodulation pilot pattern is greater than a quantity of REs on the first OFDM symbol in the second set indicated by the second demodulation pilot pattern.

In the technical solution provided in this embodiment of this disclosure, a quantity of REs occupied on each OFDM symbol in the first set indicated by the first demodulation pilot pattern of the first codeword is greater than a quantity of REs of the second demodulation pilot pattern of the second codeword on each corresponding OFDM symbol in the second set. For example, if the first set includes two OFDM symbols, a quantity of REs of the first demodulation pilot pattern on a second OFDM symbol in the first set is greater than a quantity of REs of the second demodulation pilot pattern on a second OFDM symbol in the second set. Similarly, if the first set includes three OFDM symbols, a quantity of REs of the first demodulation pilot pattern on a second OFDM symbol in the first set is greater than a quantity of REs of the second demodulation pilot pattern on a second OFDM symbol in the second set, and a quantity of REs of the first demodulation pilot pattern on a third OFDM symbol in the first set is greater than a quantity of REs of the second demodulation pilot pattern on a third OFDM symbol in the second set, and the like.

In the technical solution provided in this embodiment of this disclosure, because the MCS indication value of the first codeword is relatively large, if the demodulation pilot pattern of the first codeword occupies more REs (in other words, a frequency domain density is relatively high), accuracy of channel estimation for the first codeword is improved, a decoding success rate of the first codeword is improved, and a decoding success rate of the second codeword is improved. In addition, while the decoding success rates of the first codeword and the second codeword are ensured, time-frequency resource overheads of the demodulation pilot pattern can be reduced if the demodulation pilot pattern of the second codeword occupies fewer REs.

In an embodiment, a quantity of REs on at least one OFDM symbol in the first set indicated by the first demodulation pilot pattern is less than a quantity of REs on the first OFDM symbol in the first set indicated by the first demodulation pilot pattern.

In this embodiment, quantities of REs on OFDM symbols in the first set indicated by the first demodulation pilot pattern may successively decrease in an order of time domain locations from front to back that are of the OFDM symbols in the first set. For example, if the first set includes two OFDM symbols, a quantity of REs on a second OFDM symbol in the first set indicated by the first demodulation pilot pattern is less than a quantity of REs on a first OFDM symbol in the first set indicated by the first demodulation pilot pattern. If the first set includes three OFDM symbols, a quantity of REs on a second OFDM symbol in the first set indicated by the first demodulation pilot pattern is less than a quantity of REs on a first OFDM symbol in the first set indicated by the first demodulation pilot pattern, and then a quantity of REs on a third OFDM symbol in the first set indicated by the first demodulation pilot pattern is less than the quantity of REs on the second OFDM symbol in the first set indicated by the first demodulation pilot pattern. In addition, only the quantities of REs on the OFDM symbols in the first set indicated by the first demodulation pilot pattern may be less than the quantity of REs on the first OFDM symbol in the first set indicated by the first demodulation pilot pattern. A specific setting manner is not limited herein.

In the technical solution provided in this disclosure, time-frequency resource overheads of the demodulation pilot pattern can be reduced to a greatest extent when correct decoding of the first codeword is ensured.

In an embodiment, an RE set on the at least one OFDM symbol in the first set is a proper subset of an RE set on the first OFDM symbol in the first set. Alternatively, an intersection of an RE set on the at least one OFDM symbol in the first set and an RE set on the first OFDM symbol in the first set is an empty set.

In actual applications, an RE occupied on each OFDM symbol in the first set indicated by the first demodulation pilot pattern is not empty. In addition, an RE set on each OFDM symbol in the first set indicated by the first demodulation pilot pattern may be a proper subset of an RE set on the first OFDM symbol in the first set indicated by the first demodulation pilot pattern or an intersection of an RE set on each OFDM symbol in the first set indicated by the first demodulation pilot pattern and an RE set on the first OFDM symbol in the first set indicated by the first demodulation pilot pattern is an empty set. For example, if the first set includes two OFDM symbols, an RE set on a second OFDM symbol in the first set indicated by the first demodulation pilot pattern is a proper subset of an RE set on a first OFDM symbol in the first set indicated by the first demodulation pilot pattern. If the first set includes three OFDM symbols, an RE set on a second OFDM symbol in the first set indicated by the first demodulation pilot pattern is a proper subset of an RE set on a first OFDM symbol in the first set indicated by the first demodulation pilot pattern, and then an RE set on a third OFDM symbol in the first set indicated by the first demodulation pilot pattern is a proper subset of the RE set on the first OFDM symbol in the first set indicated by the first demodulation pilot pattern. Alternatively, if the first set includes two OFDM symbols, an intersection of an RE set on a second OFDM symbol in the first set indicated by the first demodulation pilot pattern and an RE set on a first OFDM symbol in the first set indicated by the first demodulation pilot pattern is an empty set. If the first set includes three OFDM symbols, an intersection of an RE set on a second OFDM symbol in the first set indicated by the first demodulation pilot pattern and an RE set on a first OFDM symbol in the first set indicated by the first demodulation pilot pattern is an empty set, and then an intersection of an RE set on a third OFDM symbol in the first set indicated by the first demodulation pilot pattern and the RE set on the first OFDM symbol in the first set indicated by the first demodulation pilot pattern is an empty set.

In the technical solution provided in this disclosure, that frequency domain locations of REs on OFDM symbols in the first set indicated by the first demodulation pilot pattern are consistent is applicable to a case in which channel frequency selectivity is relatively low. Therefore, complexity of performing channel interpolation by the receiving device can be reduced if the frequency domain locations of the REs on the OFDM symbols are consistent. However, that the frequency domain locations of the REs on the OFDM symbols in the first set indicated by the first demodulation pilot pattern are differentially arranged is applicable to a case in which channel frequency selectivity is relatively high. In this case, it can be ensured that the receiving device performs channel estimation at as many frequency domain locations as possible, to provide a more accurate frequency domain interpolation result, thereby improving channel estimation accuracy.

In an embodiment, in the second demodulation pilot pattern, a quantity of REs on at least one OFDM symbol in the second set indicated by the second demodulation pilot pattern is less than a quantity of REs on the first OFDM symbol indicated by the second demodulation pilot pattern.

In this embodiment, quantities of REs on OFDM symbols in the second set indicated by the second demodulation pilot pattern may successively decrease in an order of time domain locations from front to back that are of the OFDM symbols in the second set. For example, when the second set includes two OFDM symbols, a quantity of REs on a second OFDM symbol in the second set indicated by the second demodulation pilot pattern is less than a quantity of REs on a first OFDM symbol in the second set indicated by the second demodulation pilot pattern. When the second set includes three OFDM symbols, a quantity of REs on a second OFDM symbol in the second set indicated by the second demodulation pilot pattern is less than a quantity of REs on a first OFDM symbol in the second set indicated by the first demodulation pilot pattern, and then a quantity of REs on a third OFDM symbol in the second set indicated by the second demodulation pilot pattern is less than the quantity of REs on the second OFDM symbol in the second set indicated by the second demodulation pilot pattern. In addition, only the quantities of REs on the OFDM symbols in the second set indicated by the second demodulation pilot pattern may be less than the quantity of REs on the first OFDM symbol in the second set indicated by the second demodulation pilot pattern. A specific setting manner is not limited herein.

In the technical solution provided in this disclosure, time-frequency resource overheads of the demodulation pilot pattern can be reduced to a greatest extent when correct decoding of the second codeword is ensured.

In an embodiment, in the second demodulation pilot pattern, an RE set on the at least one OFDM symbol in the second set indicated by the second demodulation pilot pattern is a proper subset of an RE set on the first OFDM symbol in the second set indicated by the second demodulation pilot pattern. Alternatively, an intersection of an RE set on the at least one OFDM symbol in the second set indicated by the second demodulation pilot pattern and an RE set occupied on the first OFDM symbol in the second set indicated by the second demodulation pilot pattern is an empty set.

In actual applications, an RE on each OFDM symbol in the second set indicated by the second demodulation pilot pattern is not empty. In addition, an RE set on each OFDM symbol in the second set indicated by the second demodulation pilot pattern may be a proper subset of an RE set on the first OFDM symbol in the second set indicated by the second demodulation pilot pattern or an intersection of an RE set on each OFDM symbol in the second set indicated by the second demodulation pilot pattern and an RE set on the first OFDM symbol in the second set indicated by the second demodulation pilot pattern is an empty set. For example, if the second set includes two OFDM symbols, an RE set on a second OFDM symbol in the second set indicated by the second demodulation pilot pattern is a proper subset of an RE set on a first OFDM symbol in the second set indicated by the second demodulation pilot pattern. If the second set includes three OFDM symbols, an RE set on a second OFDM symbol in the second set indicated by the second demodulation pilot pattern is a proper subset of an RE set on a first OFDM symbol in the second set indicated by the second demodulation pilot pattern, and then an RE set on a third OFDM symbol in the second set indicated by the second demodulation pilot pattern is a proper subset of the RE set on the first OFDM symbol in the second set indicated by the second demodulation pilot pattern. Alternatively, if the second set includes two OFDM symbols, an intersection of an RE set on a second OFDM symbol in the second set indicated by the second demodulation pilot pattern and an RE set on a first OFDM symbol in the second set indicated by the second demodulation pilot pattern is an empty set. If the second set includes three OFDM symbols, an intersection of an RE set on a second OFDM symbol in the second set indicated by the second demodulation pilot pattern and an RE set on a first OFDM symbol in the second set indicated by the second demodulation pilot pattern is an empty set, and then an intersection of an RE set on a third OFDM symbol in the second set indicated by the second demodulation pilot pattern and the RE set on the first OFDM symbol in the second set indicated by the second demodulation pilot pattern is an empty set.

In the technical solution provided in this disclosure, that frequency domain locations of REs on OFDM symbols in the second set indicated by the second demodulation pilot pattern are consistent is applicable to a case in which channel frequency selectivity is relatively low. Therefore, complexity of performing channel interpolation by the receiving device can be reduced if the frequency domain locations of the REs on the OFDM symbols are consistent. However, that the frequency domain locations of the REs on the OFDM symbols in the second set indicated by the second demodulation pilot pattern are differentially arranged is applicable to a case in which channel frequency selectivity is relatively high. In this case, it can be ensured that the receiving device performs channel estimation at as many frequency domain locations as possible, to provide a more accurate frequency domain interpolation result, thereby improving channel estimation accuracy.

In an embodiment, in the second demodulation pilot pattern, a quantity of REs of the second demodulation pilot pattern on at least one OFDM symbol in the second set is greater than a quantity of REs of the second demodulation pilot pattern on the first OFDM symbol in the second set.

In this embodiment, quantities of REs on OFDM symbols in the first set indicated by the second demodulation pilot pattern may successively increase in an order of time domain locations from front to back that are of the OFDM symbols in the second set. For example, if the second set includes two OFDM symbols, a quantity of REs on a second OFDM symbol in the second set indicated by the second demodulation pilot pattern is greater than a quantity of REs on a first OFDM symbol in the second set indicated by the second demodulation pilot pattern. If the second set includes three OFDM symbols, a quantity of REs on a second OFDM symbol in the second set indicated by the second demodulation pilot pattern is greater than a quantity of REs on a first OFDM symbol in the second set indicated by the second demodulation pilot pattern, and then a quantity of REs on a third OFDM symbol in the second set indicated by the second demodulation pilot pattern is greater than the quantity of REs on the second OFDM symbol in the second set indicated by the second demodulation pilot pattern. In addition, only the quantities of REs on the OFDM symbols in the second set indicated by the second demodulation pilot pattern may be greater than the quantity of REs on the first OFDM symbol in the second set indicated by the second demodulation pilot pattern. A specific setting manner is not limited herein.

In the technical solution provided in this disclosure, decoding correctness of the second codeword can be improved. For example, if the second codeword is divided into a plurality of code blocks (Code Block) for transmission, when the second codeword is retransmitted, if only a code block of the second codeword is retransmitted on an OFDM symbol that is the same as or adjacent to that on which the code block is initially transmitted, decoding correctness of the retransmitted code block can be improved in the technical solution provided in this disclosure.

In an embodiment, the receiving device may further receive pilot configuration information sent by the base station, where the pilot configuration information is used to indicate that in the second set, quantities of REs on OFDM symbols indicated by the second demodulation pilot pattern increase or decrease in ascending order of transmission times of the OFDM symbols in the second set.

In the technical solution provided in this disclosure, the receiving device can receive a pilot signal in a correct demodulation pilot pattern.

In an embodiment, frequency domain code division multiplexing is performed on each OFDM symbol in the first set by using an orthogonal code with a length of 4; and frequency domain code division multiplexing is performed on each OFDM symbol in the second set by using an orthogonal code with a length of 4.

In the technical solution provided in this disclosure, frequency domain code division multiplexing is performed on each OFDM symbol in each of the first set and the second set by using an orthogonal code with a length of 4, so that a quantity of users performing multiplexing can be effectively increased, or a quantity of layers at which a single user can simultaneously transmit data is increased.

According to a third aspect, this disclosure provides a base station, and the base station has a function of implementing the base station in the foregoing method. The function may be implemented by hardware, or may be implemented by hardware executing corresponding software. The hardware or software includes one or more modules corresponding to the foregoing function.

In an implementation, the base station includes:

a processing unit configured to obtain a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword; and a sending module configured to map a pilot signal to a time-frequency resource based on the demodulation pilot pattern, and send the pilot signal, where a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

In another implementation, the base station includes:

a transceiver, a processor, and a bus, where the transceiver is connected to the processor by using the bus;

the processor performs the following steps:

obtaining a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword; and the transceiver performs the following steps:

mapping a pilot signal to a time-frequency resource based on the demodulation pilot pattern, and sending the pilot signal, where a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

According to a fourth aspect, this disclosure provides a receiving device, and the receiving device has a function of implementing the receiving device in the foregoing method. The function may be implemented by hardware, or may be implemented by hardware executing corresponding software. The hardware or software includes one or more modules corresponding to the foregoing function.

In a possible implementation, the receiving device includes:

a processing module, configured to obtain a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword; and a receiving module, configured to receive a pilot signal based on the demodulation pilot pattern, where the pilot signal is sent by a base station after being mapped by the base station to a time-frequency resource based on the demodulation pilot map; and a transmission time of a first OFDM symbol in the first set is before a transmission time of a first OFDM symbol in the second set, and the first OFDM symbol in the first set is an OFDM symbol with an earliest transmission time in the first set.

In another implementation, the receiving device includes:

a transceiver, a processor, and a bus, where the transceiver is connected to the processor by using the bus;

the processor performs the following steps:

obtaining a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword; and the transceiver performs the following steps:

receiving a pilot signal based on the demodulation pilot pattern, where the pilot signal is sent by a base station after being mapped by the base station to a time-frequency resource based on the demodulation pilot map; and a transmission time of a first OFDM symbol in the first set is before a transmission time of a first OFDM symbol in the second set, and the first OFDM symbol in the first set is an OFDM symbol with an earliest transmission time in the first set.

According to a fifth aspect, this disclosure provides a data processing method, including:

before sending a pilot signal, determining, by the base station, a rank indication (RI) and pilot configuration information, and determining, based on the pilot configuration information, a target demodulation pilot pattern in a transmission time unit from a demodulation pilot pattern set corresponding to the RI, where the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and then mapping, by the base station, the pilot signal to a time-frequency resource based on the target pilot pattern, and sending the pilot signal, the pilot configuration information, and the RI.

In this embodiment, when obtaining the target demodulation pilot pattern, the base station may further first obtain a demodulation pilot pattern set corresponding to the pilot configuration information, and then determine, based on the RI, the target demodulation pilot pattern from the demodulation pilot pattern set corresponding to the pilot configuration information. In actual applications, a specific manner is not limited herein.

In this embodiment, the one-dimensional frequency domain spread spectrum pattern is a pattern in which spectrum spreading is performed on one OFDM symbol in the frequency domain by using an orthogonal code. For example, spectrum spreading is performed by using an orthogonal code with a length of N. A frequency domain shift spread spectrum pattern indicates that code division multiplexing is performed on N contiguous or discontiguous REs on a same OFDM symbol by using an orthogonal code, where N is a positive integer, for example, 2, 4, or 8. The two-dimensional time-frequency spread spectrum pattern is a pattern in which time domain spectrum spreading and frequency domain spectrum spreading are performed on more than one OFDM symbol by using an orthogonal code. For example, spectrum spreading is performed on two OFDM symbols by using an orthogonal code with a length of N. Frequency domain spectrum spreading is performed on four contiguous or discontiguous REs on each OFDM symbol, and time domain spectrum spreading is performed on the two OFDM symbols. In the technical solution provided in this disclosure, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

In an embodiment, an OFDM symbol set indicated by the target demodulation pilot pattern includes N groups of OFDM symbols, in ascending order of transmission times of the N groups of OFDM symbols, a quantity of REs on at least one OFDM symbol in the OFDM symbol set indicated by the target demodulation pilot pattern is less than a quantity of REs on a first group of OFDM symbols in the OFDM symbol set indicated by the target demodulation pilot pattern, and each group of OFDM symbols in the OFDM symbol set indicated by the target demodulation pilot pattern includes at least one OFDM symbol, where N is a positive integer.

In this embodiment, quantities of REs on groups of OFDM symbols in the OFDM symbol set indicated by the target demodulation pilot pattern may successively decrease in an order of time domain locations from front to back that are of the groups of OFDM symbols in the OFDM symbol set. For example, if the OFDM symbol set includes two groups of OFDM symbols, a quantity of REs on a second group of OFDM symbols in the OFDM symbol set indicated by the target demodulation pilot pattern is less than a quantity of REs on a first group of OFDM symbols in the OFDM symbol set indicated by the target demodulation pilot pattern. If the OFDM symbol set includes three groups of OFDM symbols, a quantity of REs on a second group of OFDM symbols in the OFDM symbol set indicated by the target demodulation pilot pattern is less than a quantity of REs on a first group of OFDM symbols in the OFDM symbol set indicated by the target demodulation pilot pattern, and then a quantity of REs on a third group of OFDM symbols in the OFDM symbol set indicated by the target demodulation pilot pattern is less than the quantity of REs on the second group of OFDM symbols in the OFDM symbol set indicated by the target demodulation pilot pattern. In addition, only the quantities of REs on the groups of OFDM symbols in the OFDM symbol set indicated by the target demodulation pilot pattern may be less than the quantity of REs on the first group of OFDM symbols in the OFDM symbol set indicated by the target demodulation pilot pattern. A specific setting manner is not limited herein.

In the technical solution provided in this disclosure, time-frequency resource overheads of the target demodulation pilot pattern can be reduced to a greatest extent when correct decoding is ensured.

In an embodiment, an intersection of an RE set on at least one group of OFDM symbols in the OFDM symbol set indicated by the target demodulation pilot pattern and an RE set on the first group of OFDM symbols in the OFDM symbol set indicated by the target demodulation pilot pattern is an empty set. Alternatively, an RE set on at least one group of OFDM symbols in the OFDM symbol set indicated by the target demodulation pilot pattern is a proper subset of an RE set on the first group of OFDM symbols in the OFDM symbol set indicated by the target demodulation pilot pattern.

In actual applications, an RE on each group of OFDM symbols in the OFDM symbol set indicated by the target demodulation pilot pattern is not empty. In addition, an RE set on each group of OFDM symbols in the OFDM symbol set indicated by the target demodulation pilot pattern may be a proper subset of an RE set on the first group of OFDM symbols in the OFDM symbol set indicated by the target demodulation pilot pattern or an intersection of an RE set on each group of OFDM symbols in the OFDM symbol set indicated by the target demodulation pilot pattern and an RE set on the first group of OFDM symbols in the OFDM symbol set indicated by the target demodulation pilot pattern may be an empty set. For example, if the OFDM symbol set includes two groups of OFDM symbols, an RE set on a second group of OFDM symbols in the OFDM symbol set indicated by the target demodulation pilot pattern is a proper subset of an RE set on a first group of OFDM symbols in the OFDM symbol set indicated by the target demodulation pilot pattern. If the OFDM symbol set includes three groups of OFDM symbols, an RE set on a second group of OFDM symbols in the OFDM symbol set indicated by the target demodulation pilot pattern is a proper subset of an RE set on a first group of OFDM symbols in the OFDM symbol set indicated by the target demodulation pilot pattern, and then an RE set on a third group of OFDM symbols in the OFDM symbol set indicated by the target demodulation pilot pattern is a proper subset of the RE set on the first group of OFDM symbols in the OFDM symbol set indicated by the target demodulation pilot pattern. Alternatively, if the OFDM symbol set includes two groups of OFDM symbols, an intersection of an RE set on a second group of OFDM symbols in the OFDM symbol set indicated by the target demodulation pilot pattern and an RE set on a first group of OFDM symbols in the OFDM symbol set indicated by the target demodulation pilot pattern is an empty set. If the OFDM symbol set includes three groups of OFDM symbols, an intersection of an RE set on a second group of OFDM symbols in the OFDM symbol set indicated by the target demodulation pilot pattern and an RE set on a first group of OFDM symbols in the OFDM symbol set indicated by the target demodulation pilot pattern is an empty set, and then an intersection of an RE set on a third group of OFDM symbols in the OFDM symbol set indicated by the target demodulation pilot pattern and the RE set on the first group of OFDM symbols in the OFDM symbol set indicated by the target demodulation pilot pattern is an empty set.

In the technical solution provided in this disclosure, that frequency domain locations of REs on groups of OFDM symbols indicated by the target demodulation pilot pattern are consistent is applicable to a case in which channel frequency selectivity is relatively low. Therefore, complexity of performing channel interpolation by a receiving device can be reduced if the frequency domain locations of the REs on the OFDM symbols are consistent. However, that the frequency domain locations of the REs on the OFDM symbols indicated by the target demodulation pilot pattern are differentially arranged is applicable to a case in which channel frequency selectivity is relatively high. In this case, it can be ensured that the receiving device performs channel estimation at as many frequency domain locations as possible, to provide a more accurate frequency domain interpolation result, thereby improving channel estimation accuracy.

In actual applications, different RIs correspond to different pilot patterns in the demodulation pilot pattern set. A specific case includes but is not limited to the following several possible implementations:

In an implementation, when the RI is equal to 1 or 2, an orthogonal code pattern of a demodulation pilot pattern in the demodulation pilot pattern set includes: performing frequency domain code division multiplexing on each group of OFDM symbols by using an orthogonal code with a length of 2, where each group of OFDM symbols includes one OFDM symbol; performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In another implementation, when the RI is equal to 3 or 4, an orthogonal code pattern of a demodulation pilot pattern in the demodulation pilot pattern set includes: performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In another implementation, when the RI belongs to a set {5, 6, 7, 8}, an orthogonal code pattern of a demodulation pilot pattern in the demodulation pilot pattern set includes: performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain; and performing frequency domain code division multiplexing on a first OFDM symbol in each group of OFDM symbols by using an orthogonal code with a length of 4, and performing frequency domain code division multiplexing on a second OFDM symbol in each group of OFDM symbols by using an orthogonal code with a length of 4, where each group of OFDM symbols includes two consecutive OFDM symbols in the time domain.

In the technical solution provided in this embodiment of this disclosure, the RI corresponds to at least two different demodulation pilot patterns, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

According to a sixth aspect, this disclosure provides a data processing method. The method includes:

obtaining, by a receiving device, a target demodulation pilot pattern in a transmission time unit, where the target demodulation pilot map is determined, based on pilot configuration information, by a base station from a demodulation pilot pattern set corresponding to a rank indication RI; the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and receiving, by the receiving device, a pilot signal based on the target demodulation pilot pattern, where the pilot signal is sent by the base station after being mapped by the base station to a time-frequency resource based on the target demodulation pilot pattern.

In this embodiment, the one-dimensional frequency domain spread spectrum pattern is a pattern in which spectrum spreading is performed on one OFDM symbol in the frequency domain by using an orthogonal code. For example, spectrum spreading is performed by using an orthogonal code with a length of N. A frequency domain shift spread spectrum pattern indicates that code division multiplexing is performed on N contiguous or discontiguous REs on a same OFDM symbol by using an orthogonal code, where N is a positive integer, for example, 2, 4, or 8. The two-dimensional time-frequency spread spectrum pattern is a pattern in which time domain spectrum spreading and frequency domain spectrum spreading are performed on more than one OFDM symbol by using an orthogonal code. For example, spectrum spreading is performed on two OFDM symbols by using an orthogonal code with a length of N. Frequency domain spectrum spreading is performed on four contiguous or discontiguous REs on each OFDM symbol, and time domain spectrum spreading is performed on the two OFDM symbols.

In the technical solution provided in this disclosure, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

In an embodiment, an OFDM symbol set indicated by the target demodulation pilot pattern includes N groups of OFDM symbols, in ascending order of transmission times of the N groups of OFDM symbols, a quantity of REs on at least one OFDM symbol in the OFDM symbol set indicated by the target demodulation pilot pattern is less than a quantity of REs on a first group of OFDM symbols in the OFDM symbol set indicated by the target demodulation pilot pattern, and each group of OFDM symbols in the OFDM symbol set indicated by the target demodulation pilot pattern includes at least one OFDM symbol, where N is a positive integer.

In this embodiment, quantities of REs on groups of OFDM symbols in the OFDM symbol set indicated by the target demodulation pilot pattern may successively decrease in an order of time domain locations from front to back that are of the groups of OFDM symbols in the OFDM symbol set. For example, if the OFDM symbol set includes two groups of OFDM symbols, a quantity of REs on a second group of OFDM symbols in the OFDM symbol set indicated by the target demodulation pilot pattern is less than a quantity of REs on a first group of OFDM symbols in the OFDM symbol set indicated by the target demodulation pilot pattern. If the OFDM symbol set includes three groups of OFDM symbols, a quantity of REs on a second group of OFDM symbols in the OFDM symbol set indicated by the target demodulation pilot pattern is less than a quantity of REs on a first group of OFDM symbols in the OFDM symbol set indicated by the target demodulation pilot pattern, and then a quantity of REs on a third group of OFDM symbols in the OFDM symbol set indicated by the target demodulation pilot pattern is less than the quantity of REs on the second group of OFDM symbols in the OFDM symbol set indicated by the target demodulation pilot pattern. In addition, only the quantities of REs on the groups of OFDM symbols in the OFDM symbol set indicated by the target demodulation pilot pattern may be less than the quantity of REs on the first group of OFDM symbols in the OFDM symbol set indicated by the target demodulation pilot pattern. A specific setting manner is not limited herein.

In the technical solution provided in this disclosure, time-frequency resource overheads of the target demodulation pilot pattern can be reduced to a greatest extent when correct decoding is ensured.

In an embodiment, an intersection of an RE set on at least one group of OFDM symbols in the OFDM symbol set indicated by the target demodulation pilot pattern and an RE set on the first group of OFDM symbols in the OFDM symbol set indicated by the target demodulation pilot pattern is an empty set. Alternatively, an RE set on at least one group of OFDM symbols in the OFDM symbol set indicated by the target demodulation pilot pattern is a proper subset of an RE set on the first group of OFDM symbols in the OFDM symbol set indicated by the target demodulation pilot pattern.

In actual applications, an RE on each group of OFDM symbols in the OFDM symbol set indicated by the target demodulation pilot pattern is not empty. In addition, an RE set on each group of OFDM symbols in the OFDM symbol set indicated by the target demodulation pilot pattern may be a proper subset of an RE set on the first group of OFDM symbols in the OFDM symbol set indicated by the target demodulation pilot pattern or an intersection of an RE set on each group of OFDM symbols in the OFDM symbol set indicated by the target demodulation pilot pattern and an RE set on the first group of OFDM symbols in the OFDM symbol set indicated by the target demodulation pilot pattern may be an empty set. For example, if the OFDM symbol set includes two groups of OFDM symbols, an RE set on a second group of OFDM symbols in the OFDM symbol set indicated by the target demodulation pilot pattern is a proper subset of an RE set on a first group of OFDM symbols in the OFDM symbol set indicated by the target demodulation pilot pattern. If the OFDM symbol set includes three groups of OFDM symbols, an RE set on a second group of OFDM symbols in the OFDM symbol set indicated by the target demodulation pilot pattern is a proper subset of an RE set on a first group of OFDM symbols in the OFDM symbol set indicated by the target demodulation pilot pattern, and then an RE set on a third group of OFDM symbols in the OFDM symbol set indicated by the target demodulation pilot pattern is a proper subset of the RE set on the first group of OFDM symbols in the OFDM symbol set indicated by the target demodulation pilot pattern. Alternatively, if the OFDM symbol set includes two groups of OFDM symbols, an intersection of an RE set on a second group of OFDM symbols in the OFDM symbol set indicated by the target demodulation pilot pattern and an RE set on a first group of OFDM symbols in the OFDM symbol set indicated by the target demodulation pilot pattern is an empty set. If the OFDM symbol set includes three groups of OFDM symbols, an intersection of an RE set on a second group of OFDM symbols in the OFDM symbol set indicated by the target demodulation pilot pattern and an RE set on a first group of OFDM symbols in the OFDM symbol set indicated by the target demodulation pilot pattern is an empty set, and then an intersection of an RE set on a third group of OFDM symbols in the OFDM symbol set indicated by the target demodulation pilot pattern and the RE set on the first group of OFDM symbols in the OFDM symbol set indicated by the target demodulation pilot pattern is an empty set.

In the technical solution provided in this disclosure, that frequency domain locations of REs on groups of OFDM symbols indicated by the target demodulation pilot pattern are consistent is applicable to a case in which channel frequency selectivity is relatively low. Therefore, complexity of performing channel interpolation by the receiving device can be reduced if the frequency domain locations of the REs on the OFDM symbols are consistent. However, that the frequency domain locations of the REs on the OFDM symbols indicated by the target demodulation pilot pattern are differentially arranged is applicable to a case in which channel frequency selectivity is relatively high. In this case, it can be ensured that the receiving device performs channel estimation at as many frequency domain locations as possible, to provide a more accurate frequency domain interpolation result, thereby improving channel estimation accuracy.

In actual applications, different RIs correspond to different pilot patterns in the demodulation pilot pattern set. A specific case includes but is not limited to the following several possible implementations:

In an implementation, when the RI is equal to 1 or 2, an orthogonal code pattern of a demodulation pilot pattern in the demodulation pilot pattern set includes: performing frequency domain code division multiplexing on each group of OFDM symbols by using an orthogonal code with a length of 2, where each group of OFDM symbols includes one OFDM symbol; performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In another implementation, when the RI is equal to 3 or 4, an orthogonal code pattern of a demodulation pilot pattern in the demodulation pilot pattern set includes: performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In another implementation, when the RI belongs to a set {5, 6, 7, 8}, an orthogonal code pattern of a demodulation pilot pattern in the demodulation pilot pattern set includes: performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain; and performing frequency domain code division multiplexing on a first OFDM symbol in each group of OFDM symbols by using an orthogonal code with a length of 4, and performing frequency domain code division multiplexing on a second OFDM symbol in each group of OFDM symbols by using an orthogonal code with a length of 4, where each group of OFDM symbols includes two consecutive OFDM symbols in the time domain.

In the technical solution provided in this embodiment of this disclosure, the RI corresponds to at least two different demodulation pilot patterns, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

According to a seventh aspect, this disclosure provides a base station, and the base station has a function of implementing the base station in the foregoing method. The function may be implemented by hardware, or may be implemented by hardware executing corresponding software. The hardware or software includes one or more modules corresponding to the foregoing function.

In an implementation, the base station includes:
a processing module configured to: determine a rank indication RI and pilot configuration information, and determine, based on the pilot configuration information, a target demodulation pilot pattern in a transmission time unit from a demodulation pilot pattern set corresponding to the RI, where the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and a sending module, configured to: map a pilot signal to a time-frequency resource based on the target pilot pattern, and send the pilot signal, the pilot configuration information, and the RI.

In another implementation, the base station includes:
a transceiver, a processor, and a bus, where
the transceiver is connected to the processor by using the bus;
the processor performs the following steps: determining a rank indication RI and pilot configuration information, and determining, based on the pilot configuration information, a target demodulation pilot pattern in a transmission time unit from a demodulation pilot pattern set corresponding to the RI, where the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and the transceiver performs the following steps:
mapping a pilot signal to a time-frequency resource based on the target pilot pattern, and sending the pilot signal, the pilot configuration information, and the RI.

According to an eighth aspect, this disclosure provides a receiving device, and the receiving device has a function of implementing the receiving device in the foregoing method. The function may be implemented by hardware, or may be implemented by hardware executing corresponding software. The hardware or software includes one or more modules corresponding to the foregoing function.

In an implementation, the receiving device includes:
a processing module, configured to obtain a target demodulation pilot pattern in a transmission time unit, where the target demodulation pilot map is determined, based on pilot configuration information, by a base station from a demodulation pilot pattern set corresponding to a rank indication RI; the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and a receiving module, configured to receive a pilot signal based on the target demodulation pilot pattern, where the pilot signal is sent by the base station after being mapped by the base station to a time-frequency resource based on the target demodulation pilot pattern.

In another implementation, the receiving device includes:
a transceiver, a processor, and a bus, where
the transceiver is connected to the processor by using the bus;
the processor performs the following steps:
obtaining a target demodulation pilot pattern in a transmission time unit, where the target demodulation pilot map is determined, based on pilot configuration information, by a base station from a demodulation pilot pattern set corresponding to a rank indication RI; the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and the transceiver performs the following step:

receiving a pilot signal based on the target demodulation pilot pattern, where the pilot signal is sent by the base station after being mapped by the base station to a time-frequency resource based on the target demodulation pilot pattern.

According to a ninth aspect, this disclosure provides a computer readable storage medium, including an instruction. When the instruction runs on a computer, the computer performs the foregoing methods.

According to a tenth aspect, this disclosure provides a computer program product including an instruction. When the computer program product runs on a computer, the computer performs the foregoing methods.

It can be learned from the foregoing technical solutions that the embodiments of this disclosure have the following advantages: When the base station sends the pilot signal by using the time-frequency resource, the transmission time of the first OFDM symbol in the first set is before the transmission time of the first OFDM symbol in the second set. To be specific, in an entire pilot signal transmission process, the receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

DESCRIPTION OF EMBODIMENTS

Embodiments of this disclosure provide a data processing method, a pilot pattern generation method, and a related apparatus, to effectively advance a decoding time of the second codeword while effectively improving decoding correctness of the second codeword.

In the specification, claims, and accompanying drawings of this disclosure, the terms "first", "second", "third", "fourth", and the like (if existent) are intended to distinguish between similar objects but do not necessarily indicate a specific order or sequence. It should be understood that the data termed in such a way is interchangeable in proper circumstances, so that the embodiments described herein can be implemented in an order other than the order illustrated or described herein. In addition, the terms "include", "have", and any other variants mean to cover a non-exclusive inclusion. For example, a process, method, system, product, or device that includes a series of steps or units is not necessarily limited to those expressly listed steps or units, but may include other steps or units that are not expressly listed or inherent to such a process, method, product, or device.

Figure 1:
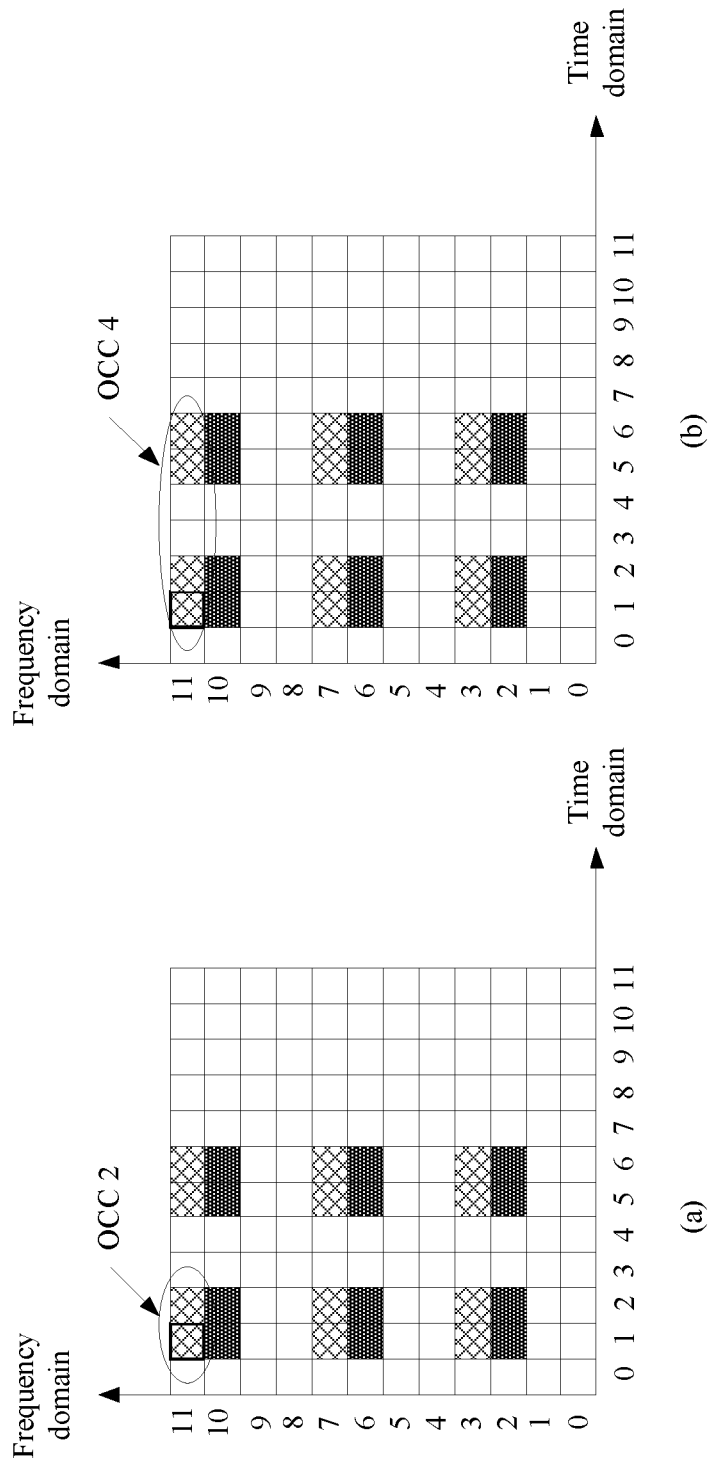
FIG. 1 is a schematic diagram of an existing demodulation pilot pattern.

In a communication process, a DMRS of service data and the service data are simultaneously sent, and are located in a same time-frequency resource range. Data at each layer has a corresponding DMRS port when a base station simultaneously transmits data at a plurality of layers. Same precoding is performed on a DMRS on a DMRS port of data at each layer and the data at the layer. Therefore, channel estimation may be performed by using the DMRS of the data at the layer. A channel through which the data at the layer is transmitted is used to demodulate and decode the data at the layer. When the base station simultaneously transmits the data at the plurality of layers, code division multiplexing is performed on a plurality of DMRS ports by using an OCC in the frequency domain and/or time domain. A spread spectrum gain can be obtained through code division multiplexing to improve channel estimation performance. In the prior art, when a base station simultaneously transmits a plurality of codewords, as shown in FIG. 1, DMRS ports corresponding to codewords occupy a same OFDM symbol, and DMRS ports of the plurality of codewords have a same frequency domain density. Consequently, in a decoding process, a first codeword needs to be decoded after time-frequency resources of the first codeword and a second codeword are received, and the second codeword needs to be decoded after the first codeword is decoded, thereby resulting in a large data decoding delay. In addition, in the prior art, there may be two DMRS patterns for a same rank indication (RI). For example, the RI is 1 or 2. When performing single user multiple-input multiple-output (MIMO) transmission to a terminal device, the base station configures a DMRS pattern whose orthogonal cover code (OCC) length is 2 for the terminal device, as shown in FIG. 1(a). When performing multi-user MIMO transmission on a terminal, for example, multiplexing two terminal devices, where an RI of each terminal device is equal to 2, the base station configures a DMRS pattern whose OCC length is 4 for each terminal device, as shown in FIG. 1(b). The two patterns occupy a same quantity of REs (12 REs), but have different OCC lengths. In this case, based on the DMRS pattern in FIG. 1(a), the terminal device may perform channel estimation on a time-frequency resource of each group of OCCs with a length of 2, so that a total of six sets of channel estimation data can be obtained, and two-dimensional time-frequency channel interpolation is performed in an entire subframe, to obtain a channel estimation result of each RE. Based on the DMRS pattern in FIG. 1(b), the terminal device may perform channel estimation on a time-frequency resource of each group of OCCs with a length of 4, so that a total of three sets of channel estimation data can be obtained, and two-dimensional time-frequency channel interpolation is performed in an entire subframe, to obtain a channel estimation result of each RE. Because only the three sets of channel estimation data can be obtained in the DMRS pattern in FIG. 1(b) for channel interpolation, performance in the DMRS pattern in FIG. 1(b) is poorer than that in the DMRS pattern in FIG. 1(a) in terms of an overall channel estimation result of the entire subframe. Therefore, in the prior art, when the OCC length changes, the channel estimation performance is negatively affected.

To resolve this problem, an embodiment of this disclosure provides the following technical solution. In an embodiment, the process includes: before transmitting a pilot signal, obtaining, by the base station, a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each OFDM symbol in a first set of OFDM symbols (alternatively referred to as a first OFDM symbol set or a first set), and the second demodulation pilot pattern indicates a time-frequency resource of each OFDM symbol in a second set of OFDM symbols (alternatively referred to as a second OFDM symbol set or a second set); and a modulation and coding scheme (MCS) indication value of the first codeword is greater than an MCS indication value of the second codeword; and then mapping, by the base station, a pilot signal to a time-frequency resource based on the demodulation pilot pattern, and finally, sending, by the base station, the pilot signal, where when the base station sends (transmits) the time-frequency resource of the OFDM symbols in the first and second sets, a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

The following separately describes a codeword status in which the base station sends the pilot signal.

1. The base station transmits the pilot signal by using a plurality of codewords.

Figure 2:
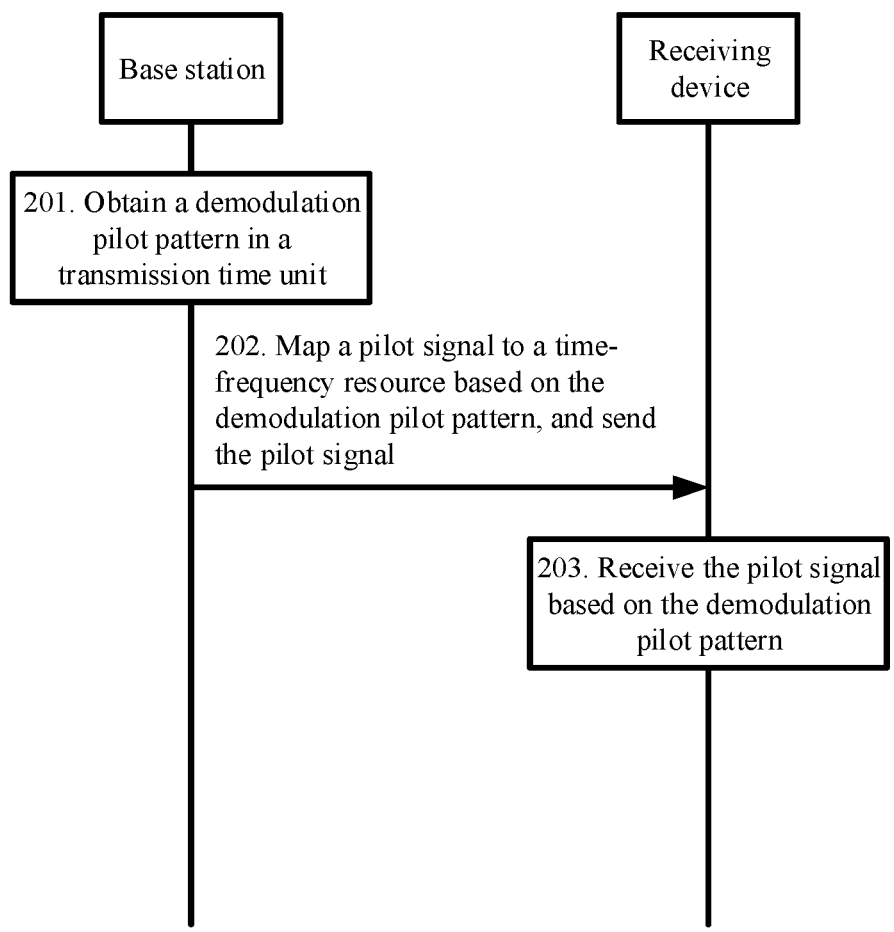
FIG. 2 is a schematic diagram of an embodiment of a data processing method according to an embodiment of this disclosure.

FIG. 2 illustrates an embodiment of a data processing method according to an embodiment of this disclosure. The data processing method includes the following steps:

201. The base station obtains a demodulation pilot pattern in a transmission time unit. The transmission time unit may be a physical resource unit for a time-domain signal. The transmission time unit may be a subframe, an OFDM symbols RE, a number of OFDM symbols per transmission time interval.

Before the base station sends a pilot signal, the base station obtains a demodulation pilot pattern in a transmission time unit in which the pilot signal is sent, where the demodulation pilot pattern includes a first demodulation pilot pattern on a demodulation reference signal port of a first codeword and a second demodulation pilot pattern on a demodulation reference signal port of a second codeword; the first demodulation pilot pattern indicates a time-frequency resource of each OFDM symbol in a first set of OFDM symbols (also referred to as first OFDM symbol set, or first set), and the second demodulation pilot pattern indicates a time-frequency resource of each OFDM symbol in a second set of OFDM symbols (also referred to as second OFDM symbol set, or second set); and an MCS indication value of the first codeword is greater than an MCS indication value of the second codeword. In addition, a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

Figure 3:
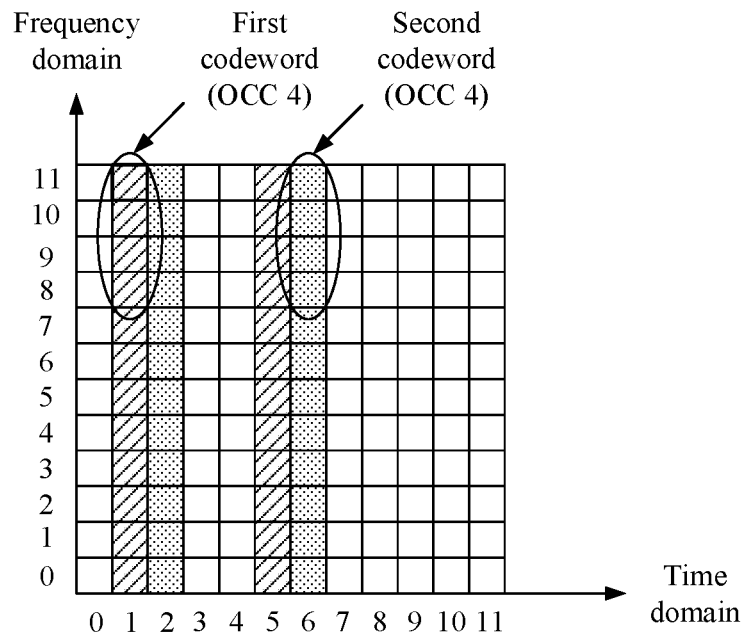
FIG. 3 is a schematic diagram of a demodulation pilot pattern according to an embodiment of this disclosure.

FIG. 3 shows a demodulation pilot pattern in a transmission time unit, where the horizontal axis denotes a set of OFDM symbols in the time domain, the vertical axis denotes the subcarriers in the frequency domain, and frequency domain code division multiplexing is performed on both the first codeword and the second codeword by using an OCC with a length of 4. In FIG. 3, a left-to-right sequence is a front-to-back sequence in the time domain. To be specific, a first OFDM symbol of the first codeword is an OFDM symbol whose time domain is 1, and a first OFDM symbol of the second codeword is an OFDM symbol whose time domain is 2. Similarly, a second OFDM symbol of the first codeword is an OFDM symbol whose time domain is 5, and a second OFDM symbol of the second codeword is an OFDM symbol whose time domain is 6. Each demodulation pilot pattern in this embodiment is shown according to this rule. It can be learned from FIG. 3 that the first OFDM symbol of the first codeword occupies all REs in the frequency domain, namely, 12 REs, and the first OFDM symbol of the second codeword occupies all REs in the frequency domain, namely, 12 REs.

Figure 4:
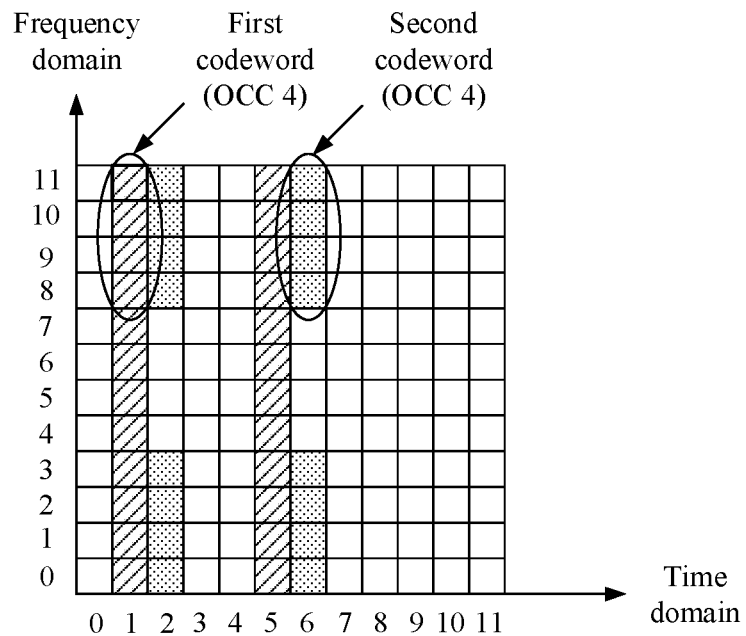
FIG. 4 is another schematic diagram of a demodulation pilot pattern according to an embodiment of this disclosure.

In actual applications, the demodulation pilot pattern further includes but is not limited to the following features:

In an implementation, a quantity of REs on a first OFDM symbol in the first OFDM symbol set indicated by the first demodulation pilot pattern is greater than a quantity of REs on a first OFDM symbol in the second OFDM symbol set indicated by the second demodulation pilot pattern. As shown in FIG. 4, a first OFDM symbol of the first codeword occupies all REs in the frequency domain, namely, 12 REs, and a first OFDM symbol of the second codeword occupies some REs shown in FIG. 4 in the frequency domain, namely, eight REs. FIG. 4 shows only one possible implementation. In actual applications, a second OFDM symbol of the second codeword occupies eight REs shown in FIG. 4 in the frequency domain, or may occupy another quantity of REs. This is not specifically limited herein, provided that a quantity of REs occupied on the first OFDM symbol of the first codeword is greater than a quantity of REs occupied on the first OFDM symbol of the second codeword.

Figure 5:
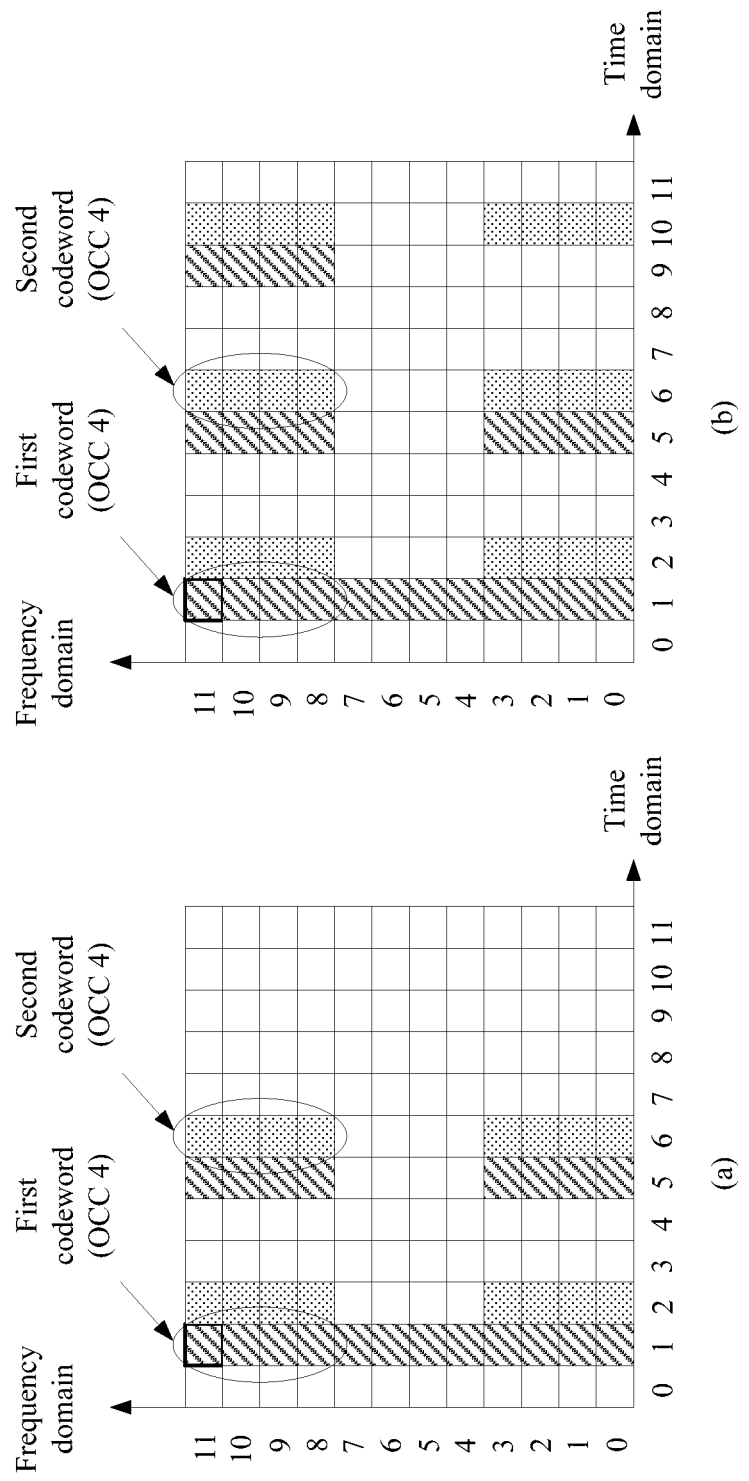
FIG. 5 is another schematic diagram of a demodulation pilot pattern according to an embodiment of this disclosure.
Figure 6:
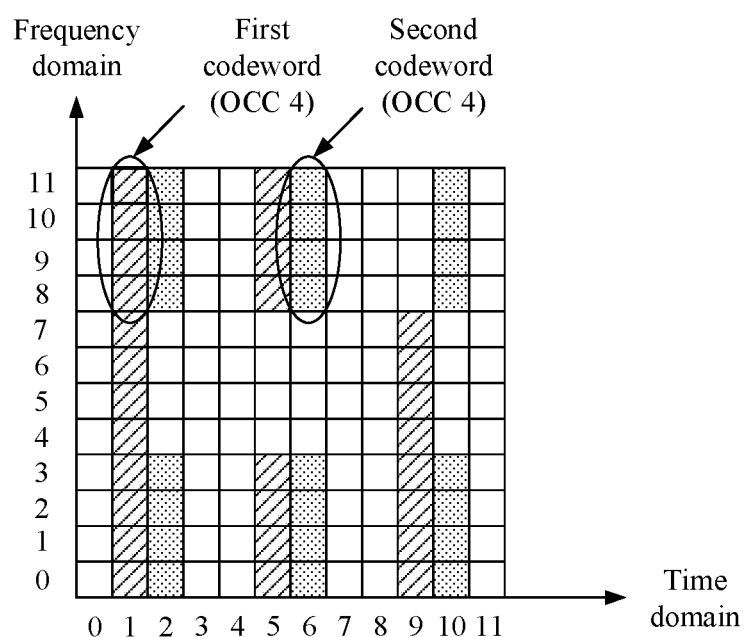
FIG. 6 is another schematic diagram of a demodulation pilot pattern according to an embodiment of this disclosure.

In another implementation, a quantity of REs occupied by the first demodulation pilot pattern on at least one OFDM symbol in the first OFDM symbol set is less than a quantity of REs occupied by the first demodulation pilot pattern on the first OFDM symbol in the first OFDM symbol set. In this embodiment, when the first demodulation pilot pattern includes two OFDM symbols in the first OFDM symbol set, as shown in FIG. 5(a), a first OFDM symbol of the first codeword occupies 12 REs in the frequency domain, and a second OFDM symbol of the first codeword occupies eight REs in the frequency domain. In actual applications, quantities of REs occupied by the first demodulation pilot pattern on OFDM symbols in the first OFDM symbol set may successively decrease in an order of time domain locations from front to back that are of the OFDM symbols in the first OFDM symbol set. For example, in this embodiment, when the first demodulation pilot pattern includes three OFDM symbols in the first OFDM symbol set, a quantity of REs occupied by the first demodulation pilot pattern on a second OFDM symbol in the first OFDM symbol set is less than a quantity of REs occupied by the first demodulation pilot pattern on a first OFDM symbol in the first OFDM symbol set, and then a quantity of REs occupied by the first demodulation pilot pattern on a third OFDM symbol in the first OFDM symbol set is less than the quantity of REs occupied by the first demodulation pilot pattern on the second OFDM symbol in the first OFDM symbol set. As shown in FIG. 5(b), a first OFDM symbol of the first codeword occupies 12 REs in the frequency domain, a second OFDM symbol of the first codeword occupies eight REs in the frequency domain, and a third OFDM symbol of the first codeword occupies four REs in the frequency domain. In addition, only the quantities of REs occupied by the first demodulation pilot pattern on the OFDM symbols in the first OFDM symbol set may be less than the quantity of REs occupied by the first demodulation pilot pattern on the first OFDM symbol in the first OFDM symbol set. As shown in FIG. 6, a first OFDM symbol of the first codeword occupies 12 REs in the frequency domain, a second OFDM symbol of the first codeword occupies eight REs in the frequency domain, and a third OFDM symbol of the first codeword occupies eight REs in the frequency domain. Certainly, FIG. 6 shows only one possible implementation. In actual applications, there may be another manner. A specific setting manner is not limited herein.

Figure 7:
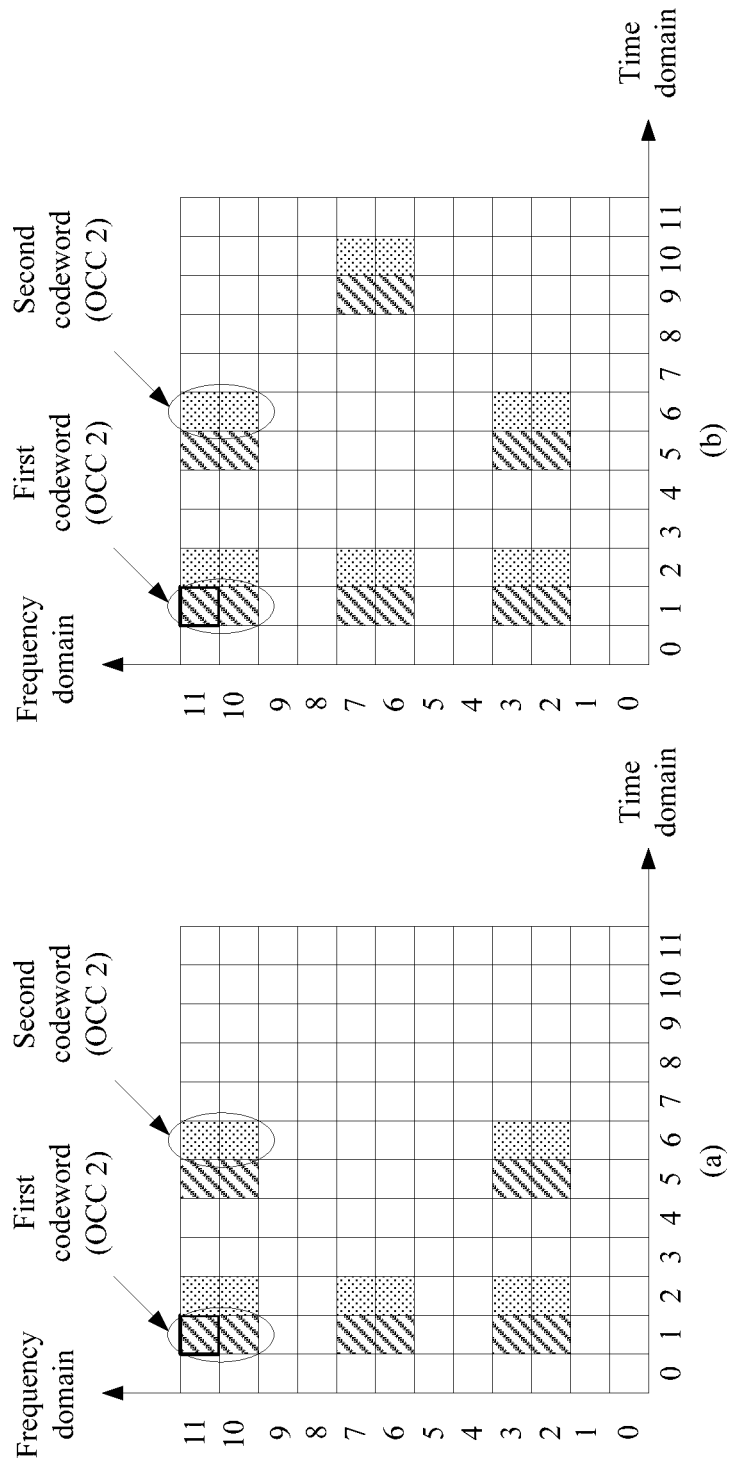
FIG. 7 is another schematic diagram of a demodulation pilot pattern according to an embodiment of this disclosure.

In another implementation, an RE set occupied by the first demodulation pilot pattern on the at least one OFDM symbol in the first OFDM symbol set is a proper subset of an RE set occupied by the first demodulation pilot pattern on the first OFDM symbol in the first OFDM symbol set. Alternatively, an intersection of an RE set occupied by the first demodulation pilot pattern on the at least one OFDM symbol in the first OFDM symbol set and an RE set occupied by the first demodulation pilot pattern on the first OFDM symbol in the first OFDM symbol set is an empty set. In actual applications, if the first demodulation pilot pattern includes two OFDM symbols in the first OFDM symbol set, FIG. 7(a) shows a demodulation pilot pattern in a transmission time unit, where the horizontal axis denotes a set of OFDM symbols in the time domain, the vertical axis denotes the subcarriers in the frequency domain, and frequency domain code division multiplexing is performed on both the first codeword and the second codeword by using an OCC with a length of 2. An RE set occupied on a first OFDM symbol of the first codeword in the frequency domain is (2, 3, 6, 7, 10, 11), and an RE set occupied on a second OFDM symbol of the first codeword in the frequency domain is (2, 3, 10, 11). Based on this, it can be learned that the RE set occupied on the second OFDM symbol of the first codeword in the frequency domain is a proper subset of the RE set occupied on the first OFDM symbol of the first codeword in the frequency domain. In actual applications, an RE set of the first demodulation pilot pattern on each OFDM symbol in the first OFDM symbol set is not empty. In addition, an RE occupied by the first demodulation pilot pattern on each OFDM symbol in the first OFDM symbol set may be a proper subset of an RE set of the first demodulation pilot pattern on the first OFDM symbol in the first OFDM symbol set. For example, if the first demodulation pilot pattern includes three OFDM symbols in the first OFDM symbol set, an RE set occupied by the first demodulation pilot pattern on a second OFDM symbol in the first OFDM symbol set is a proper subset of an RE set occupied by the first demodulation pilot pattern on a first OFDM symbol in the first OFDM symbol set, and then an RE set occupied by the first demodulation pilot pattern on a third OFDM symbol in the first OFDM symbol set is a proper subset of the RE set occupied by the first demodulation pilot pattern on the first OFDM symbol in the first OFDM symbol set. Alternatively, an intersection of the RE set of the first demodulation pilot pattern on each OFDM symbol in the first OFDM symbol set and an RE set of the first demodulation pilot pattern on the first OFDM symbol in the first OFDM symbol set is an empty set. For example, if the first demodulation pilot pattern includes three OFDM symbols in the first OFDM symbol set, an intersection of an RE set occupied by the first demodulation pilot pattern on a second OFDM symbol in the first OFDM symbol set and an RE set occupied by the first demodulation pilot pattern on a first OFDM symbol in the first OFDM symbol set is an empty set, and then an intersection of an RE set occupied by the first demodulation pilot pattern on a third OFDM symbol in the first OFDM symbol set and the RE set occupied by the first demodulation pilot pattern on the first OFDM symbol in the first OFDM symbol set is an empty set. FIG. 7(b) shows a demodulation pilot pattern in a transmission time unit, where the horizontal axis denotes a set of OFDM symbols in the time domain, the vertical axis denotes the subcarriers in the frequency domain, and frequency domain code division multiplexing is performed on both the first codeword and the second codeword by using an OCC with a length of 2. An RE set occupied on a first OFDM symbol of the first codeword in the frequency domain is (2, 3, 6, 7, 10, 11), an RE set occupied on a second OFDM symbol of the first codeword in the frequency domain is (2, 3, 10, 11), and an RE set occupied on a third OFDM symbol of the first codeword in the frequency domain is (6, 7). Based on this, it can be learned that the RE set occupied on the second OFDM symbol of the first codeword in the frequency domain and the RE set occupied on the third OFDM symbol of the first codeword in the frequency domain each are a proper subset of the RE set occupied on the first OFDM symbol of the first codeword in the frequency domain, and an intersection of the RE set occupied on the third OFDM symbol of the first codeword in the frequency domain and the RE set occupied on the second OFDM symbol of the first codeword in the frequency domain is an empty set. However, if in FIG. 7(b), an RE set occupied on a first OFDM symbol of the first codeword in the frequency domain is (2, 3, 6, 7, 10, 11), an RE set occupied on a second OFDM symbol of the first codeword in the frequency domain is (4, 5, 8, 9), and an RE set occupied on a third OFDM symbol of the first codeword in the frequency domain is (0, 1), based on this, it can be learned that an intersection of the RE set occupied on the first OFDM symbol of the first codeword in the frequency domain and each of the RE set occupied on the second OFDM symbol of the first codeword in the frequency domain and the RE set occupied on the third OFDM symbol of the first codeword in the frequency domain is an empty set, and an intersection of the RE set occupied on the third OFDM symbol of the first codeword in the frequency domain and the RE set occupied on the second OFDM symbol of the first codeword in the frequency domain is also an empty set. In this embodiment, FIG. 7 shows only one possible implementation. A specific setting manner is not limited herein.

Figure 8:
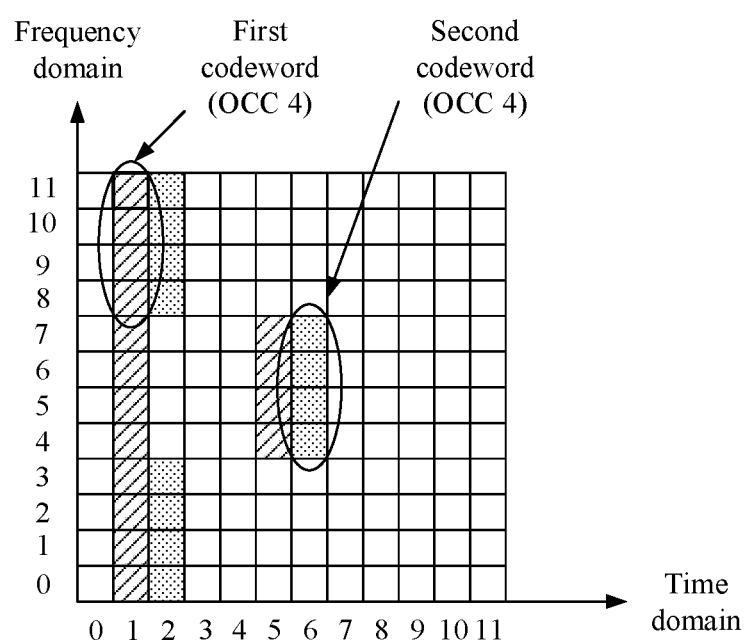
FIG. 8 is another schematic diagram of a demodulation pilot pattern according to an embodiment of this disclosure.

In another implementation, in the second demodulation pilot pattern, a quantity of REs occupied by the second demodulation pilot pattern on at least one OFDM symbol in the second OFDM symbol set is less than a quantity of REs occupied by the second demodulation pilot pattern on the first OFDM symbol in the second OFDM symbol set. As shown in FIG. 8, a first OFDM symbol of the second codeword occupies eight REs in the frequency domain, and a second OFDM symbol of the second codeword occupies four REs in the frequency domain. In this embodiment, quantities of REs occupied by the second demodulation pilot pattern on OFDM symbols in the first OFDM symbol set may successively decrease in an order of time domain locations from front to back that are of the OFDM symbols in the second OFDM symbol set. For example, a quantity of REs occupied by the second demodulation pilot pattern on a second OFDM symbol in the second OFDM symbol set is less than a quantity of REs occupied by the second demodulation pilot pattern on a first OFDM symbol in the second OFDM symbol set, and then a quantity of REs occupied by the second demodulation pilot pattern on a third OFDM symbol in the second OFDM symbol set is less than the quantity of REs occupied by the second demodulation pilot pattern on the second OFDM symbol in the second OFDM symbol set. In addition, only the quantities of REs occupied by the second demodulation pilot pattern on the OFDM symbols in the second OFDM symbol set may be less than the quantity of REs occupied by the second demodulation pilot pattern on the first OFDM symbol in the second OFDM symbol set. A specific setting manner is not limited herein.

In another implementation, in the second demodulation pilot pattern, an RE set occupied by the second demodulation pilot pattern on the at least one OFDM symbol in the second OFDM symbol set is a proper subset of an RE set occupied by the second demodulation pilot pattern on the first OFDM symbol in the second OFDM symbol set. Alternatively, an intersection of an RE set occupied by the second demodulation pilot pattern on the at least one OFDM symbol in the second OFDM symbol set and an RE set occupied by the second demodulation pilot pattern on the first OFDM symbol in the second OFDM symbol set is an empty set. As shown in FIG. 8, an RE set occupied on a first OFDM symbol of the second codeword in the frequency domain is (0, 1, 2, 3, 8, 9, 10, 11), and an RE set occupied on a second OFDM symbol of the second codeword in the frequency domain is (4, 5, 6, 7). Based on this, it can be learned that an intersection of the RE set occupied on the second OFDM symbol of the second codeword in the frequency domain and the RE set occupied on the first OFDM symbol of the second codeword in the frequency domain is an empty set. If an RE set occupied on a first OFDM symbol of the second codeword in the frequency domain is (0, 1, 2, 3, 8, 9, 10, 11), and an RE set occupied on a second OFDM symbol of the second codeword in the frequency domain is (8, 9, 10, 11), based on this, it can be learned that the RE set occupied on the second OFDM symbol of the second codeword in the frequency domain is a proper subset of the RE set occupied on the first OFDM symbol of the second codeword in the frequency domain. In actual applications, an RE occupied by the second demodulation pilot pattern on each OFDM symbol in the second OFDM symbol set is not empty. In addition, an RE occupied by the second demodulation pilot pattern on a current OFDM symbol in the second OFDM symbol set may be a proper subset of an RE set occupied by the second demodulation pilot pattern on a previous OFDM symbol in the second OFDM symbol set or an intersection of an RE occupied by the second demodulation pilot pattern on a current OFDM symbol in the second OFDM symbol set and an RE set occupied by the second demodulation pilot pattern on a previous OFDM symbol in the second OFDM symbol set may be an empty set. For example, an RE set occupied by the second demodulation pilot pattern on a second OFDM symbol in the second OFDM symbol set is a proper subset of an RE set occupied by the second demodulation pilot pattern on a first OFDM symbol in the second OFDM symbol set, and then an RE set occupied by the second demodulation pilot pattern on a third OFDM symbol in the second OFDM symbol set is a proper subset of the RE set occupied by the second demodulation pilot pattern on the second OFDM symbol in the second OFDM symbol set. Alternatively, an intersection of an RE set occupied by the second demodulation pilot pattern on a second OFDM symbol in the second OFDM symbol set and an RE set occupied by the second demodulation pilot pattern on a first OFDM symbol in the second OFDM symbol set is an empty set, and then an intersection of an RE set occupied by the second demodulation pilot pattern on a third OFDM symbol in the second OFDM symbol set and the RE set occupied by the second demodulation pilot pattern on the second OFDM symbol in the second OFDM symbol set is an empty set.

Figure 9:
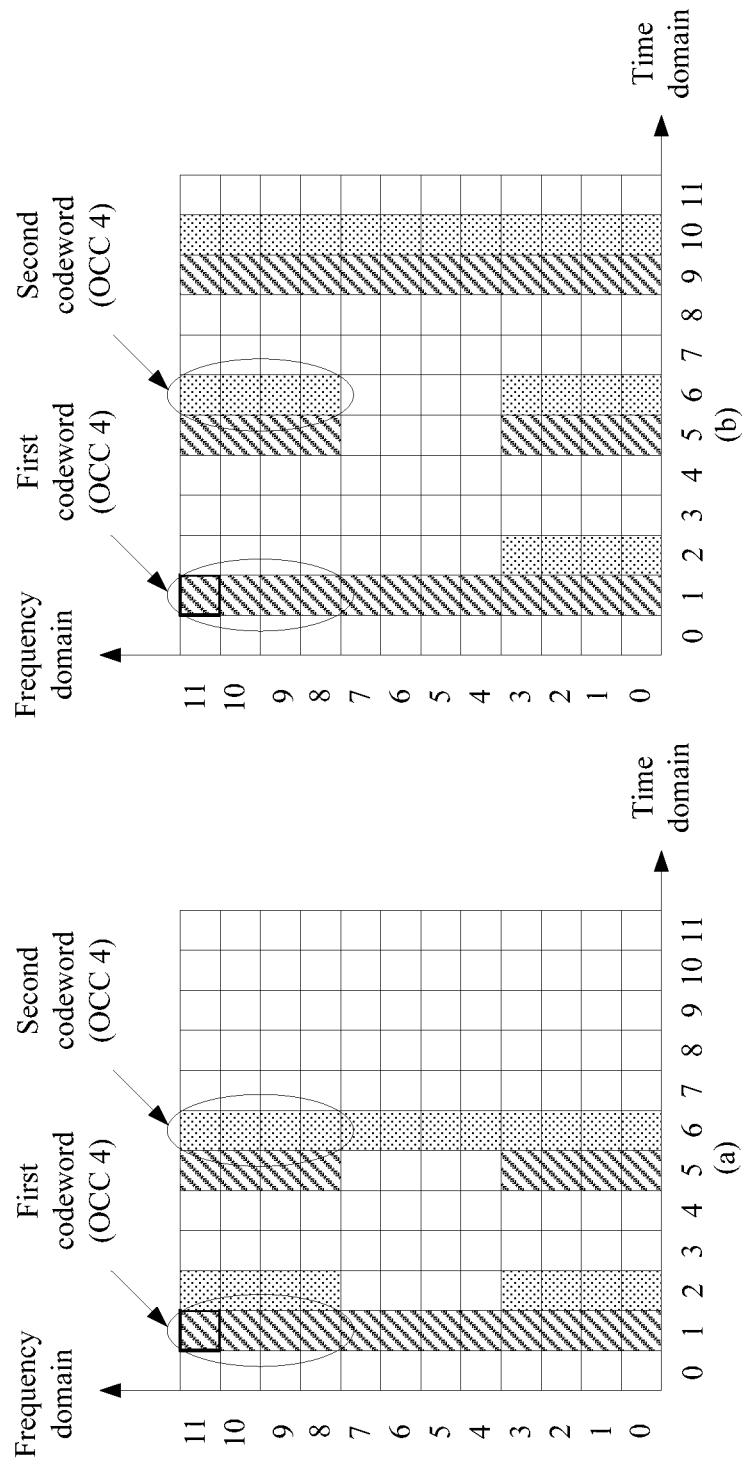
FIG. 9 is another schematic diagram of a demodulation pilot pattern according to an embodiment of this disclosure.

In another implementation, in the second demodulation pilot pattern, a quantity of REs occupied by the second demodulation pilot pattern on at least one OFDM symbol in the second OFDM symbol set is greater than a quantity of REs occupied by the second demodulation pilot pattern on the first OFDM symbol in the second OFDM symbol set. As shown in FIG. 9(a), a first OFDM symbol of the second codeword occupies eight REs in the frequency domain, and a second OFDM symbol of the second codeword occupies 12 REs in the frequency domain. In this embodiment, quantities of REs occupied by the second demodulation pilot pattern on OFDM symbols in the first OFDM symbol set may successively increase in an order of time domain locations from front to back that are of the OFDM symbols in the second OFDM symbol set. For example, a quantity of REs occupied by the second demodulation pilot pattern on a second OFDM symbol in the second OFDM symbol set is greater than a quantity of REs occupied by the second demodulation pilot pattern on a first OFDM symbol in the second OFDM symbol set, and then a quantity of REs occupied by the second demodulation pilot pattern on a third OFDM symbol in the second OFDM symbol set is greater than the quantity of REs occupied by the second demodulation pilot pattern on the second OFDM symbol in the second OFDM symbol set. As shown in FIG. 9(b), a first OFDM symbol of the second codeword occupies four REs in the frequency domain, a second OFDM symbol of the second codeword occupies eight REs in the frequency domain, and a third OFDM symbol of the second codeword occupies 12 REs in the frequency domain. In addition, only the quantities of REs occupied by the second demodulation pilot pattern on the OFDM symbols in the second OFDM symbol set may be greater than the quantity of REs occupied by the second demodulation pilot pattern on the first OFDM symbol in the second OFDM symbol set. A specific setting manner is not limited herein.

In this embodiment, the base station may select various demodulation pilot patterns based on a rank indication RI. For example, when the RI belongs to a set {5, 6, 7, 8}, the base station may select all demodulation pilot patterns in which code division multiplexing is performed by using an orthogonal code with a length of 4. When the RI is 1 or 2, the base station may select the demodulation pilot pattern shown in FIG. 7.

In an embodiment, the base station may further send pilot configuration information to a receiving device, where the pilot configuration information may be used to indicate that in the second OFMD symbol set, quantities of REs occupied by the second demodulation pilot pattern on OFDM symbols increase or decrease in an order of time domain location from front to back.

202. The base station maps a pilot signal to a time-frequency resource based on the demodulation pilot pattern, and sends the pilot signal to a receiving device.

The base station maps the to-be-sent pilot signal to the time-frequency resource based on the demodulation pilot pattern, and then sends the pilot signal to the receiving device in a network.

In this embodiment, the receiving device may be a mobile terminal, or may be another network element in the network. A specific form is not limited herein.

203. The receiving device receives the pilot signal based on the demodulation pilot pattern.

Before receiving the pilot signal, the receiving device obtains the demodulation pilot pattern and related indication information, and then the receiving device receives, based on the demodulation pilot pattern according to the related indication information, the pilot signal sent by the base station.

In the technical solution provided in this embodiment of this disclosure, in an order of time domain locations from front to back, a time domain location of the first OFDM symbol in the first OFDM symbol set is before a time domain location of the first OFDM symbol in the second OFDM symbol set. In an entire pilot signal sending process, the receiving device can immediately start to decode the first codeword after receiving a time-frequency resource of the first codeword, to advance a decoding time of the first codeword, and further advance a decoding time of the second codeword. In addition, the MCS indication value of the first codeword is greater than the MCS indication value of the second codeword, so that a decoding success rate of the first codeword can be effectively improved, to improve a decoding success rate of the second codeword.

2. The base station sends the pilot signal by using a single codeword.

Figure 10:
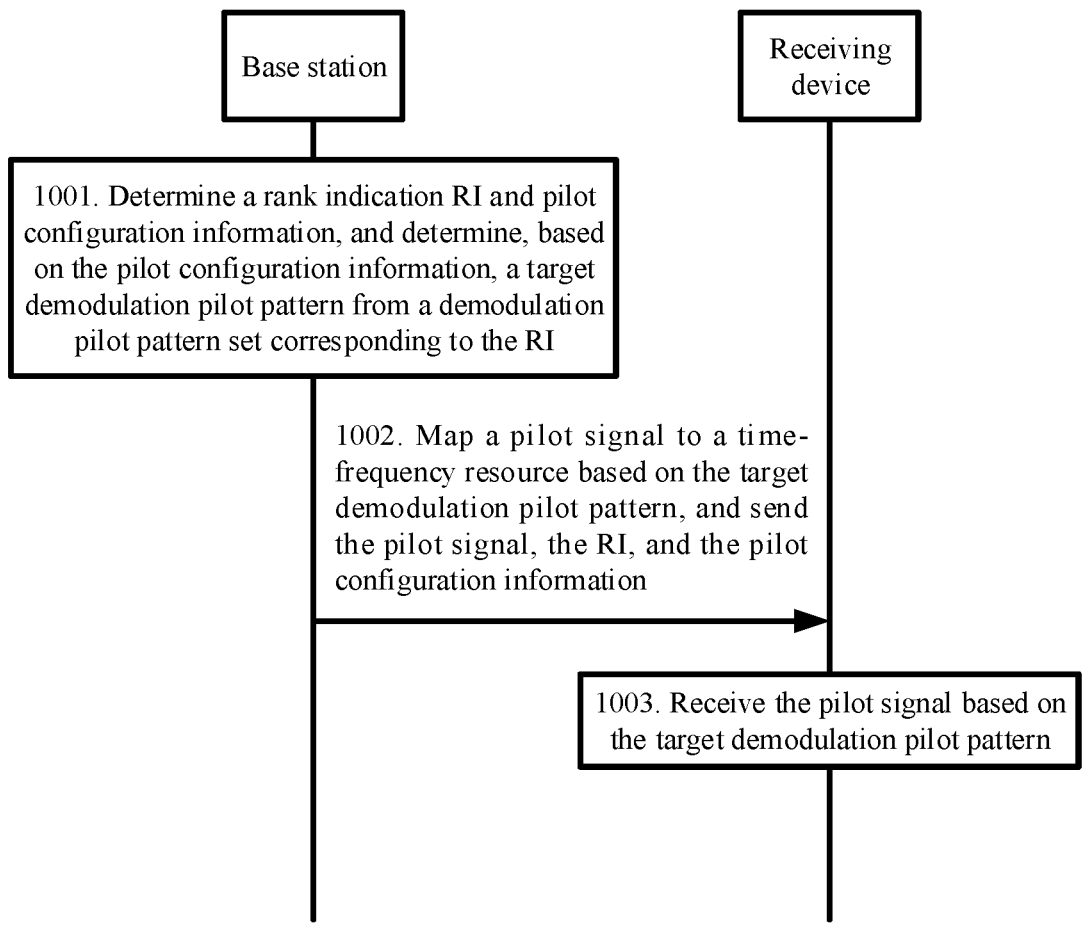
FIG. 10 is a schematic diagram of another embodiment of a data processing method according to an embodiment of this disclosure.

For details, refer to FIG. 10. Another embodiment of a data processing method according to an embodiment of this disclosure includes the following steps.

1001. The base station determines a rank indication RI and pilot configuration information, and determines, based on the pilot configuration information, a target demodulation pilot pattern from a demodulation pilot pattern set corresponding to the RI.

Before the base station sends a pilot signal, the base station obtains the pilot configuration information and the RI for sending the pilot signal, where the pilot configuration information is used to instruct the base station to select a demodulation pilot pattern from the demodulation pilot pattern set corresponding to the RI as the target demodulation pilot pattern. The demodulation pilot pattern set corresponding to the RI includes at least two demodulation pilot patterns; each demodulation pilot pattern in the demodulation pilot pattern set occupies a time-frequency resource location at which an OFDM symbol set is located, quantities of time-frequency resource elements REs occupied by demodulation pilot patterns in the demodulation pilot pattern set at occupied time-frequency resource locations are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type.

In this embodiment, the one-dimensional frequency domain spread spectrum pattern is a pattern in which spectrum spreading is performed on one OFDM symbol in the frequency domain by using an orthogonal code. For example, spectrum spreading is performed by using an orthogonal code with a length of N. A frequency domain shift spread spectrum pattern indicates that code division multiplexing is performed on N contiguous or discontiguous REs on a same OFDM symbol by using an orthogonal code, where N is a positive integer, for example, 2, 4, or 8. The two-dimensional time-frequency spread spectrum pattern is a pattern in which time domain spectrum spreading and frequency domain spectrum spreading are performed on more than one OFDM symbol by using an orthogonal code. For example, spectrum spreading is performed on two OFDM symbols by using an orthogonal code with a length of N. Frequency domain spectrum spreading is performed on four contiguous or discontiguous REs on each OFDM symbol, and time domain spectrum spreading is performed on the two OFDM symbols. In actual applications, different RIs correspond to different pilot patterns in the demodulation pilot pattern set. A specific case includes but is not limited to the following several possible implementations:

In an implementation, when the RI is equal to 1 or 2, an orthogonal code pattern of a demodulation pilot pattern in the demodulation pilot pattern set includes the following:

(1) Frequency domain code division multiplexing is performed on each group of OFDM symbols by using an orthogonal code with a length of 2, where each group of OFDM symbols includes one OFDM symbol. For example, FIG. 11(a) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 2. An RE set occupied on the first group of OFDM symbols in the frequency domain is (2, 3, 6, 7, 10, 11), and an RE set occupied on the second group of OFDM symbols in the frequency domain is (0, 1, 8, 9). Similarly, if the demodulation pilot pattern includes three groups of OFDM symbols, FIG. 11(b) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 2. An RE set occupied on the first group of OFDM symbols in the frequency domain is (2, 3, 6, 7, 10, 11), an RE set occupied on the second group of OFDM symbols in the frequency domain is (0, 1, 8, 9), and an RE set occupied on the third group of OFDM symbols in the frequency domain is (4, 5).

(2) Frequency domain code division multiplexing is performed on each group of OFDM symbols by using an orthogonal code with a length of 4, where each group of OFDM symbols includes one OFDM symbol. For example, FIG. 12(a) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 4. An RE set occupied on the first group of OFDM symbols in the frequency domain is (0, 1, 2, 3, 4, 5, 6, 7, 8, 9, 10, 11), and an RE set occupied on the second group of OFDM symbols in the frequency domain is (0, 1, 2, 3, 8, 9, 10, 11). Certainly, the demodulation pilot pattern may also be applied to another implementation. FIG. 12(b) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 4. An RE set occupied on the first group of OFDM symbols in the frequency domain is (0, 1, 2, 3, 4, 5, 6, 7, 8, 9, 10, 11), and an RE set occupied on the second group of OFDM symbols in the frequency domain is (4, 5, 6, 7). In actual applications, if the demodulation pilot pattern includes three groups of OFDM symbols, FIG. 12(c) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 4. An RE set occupied on the first group of OFDM symbols in the frequency domain is (0, 1, 2, 3, 4, 5, 6, 7, 8, 9, 10, 11), an RE set occupied on the second group of OFDM symbols in the frequency domain is (0, 1, 2, 3, 8, 9, 10, 11), and an RE set occupied on the third group of OFDM symbols in the frequency domain is (4, 5, 6, 7).

(3) Frequency domain and time domain code division multiplexing is performed on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain. For example, FIG. 13(a) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 8. An RE set occupied on the first group of OFDM symbols in the frequency domain is (0, 1, 2, 3, 4, 5, 6, 7, 8, 9, 10, 11) on an OFDM symbol 1 and an OFDM symbol 2, and an RE set occupied on the second group of OFDM symbols in the frequency domain is (0, 1, 2, 3, 8, 9, 10, 11)
on an OFDM symbol 5 and an OFDM symbol 6. Certainly, the demodulation pilot pattern may also be applied to another implementation. FIG. 13(b) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 8. An RE set occupied on the first group of OFDM symbols in the frequency domain is (0, 1, 2, 3, 4, 5, 6, 7, 8, 9, 10, 11) on an OFDM symbol 1 and an OFDM symbol 2, and an RE set occupied on the second group of OFDM symbols in the frequency domain is (4, 5, 6, 7) on an OFDM symbol 5 and an OFDM symbol 6. Similarly, if the demodulation pilot pattern includes three groups of OFDM symbols, FIG. 13(c) shows a demodulation pilot pattern in a transmission time unit, where the horizontal axis denotes a set of OFDM symbols in the time domain, the vertical axis denotes the subcarriers in the frequency domain, and frequency domain code division multiplexing is performed in the demodulation pilot pattern by using an OCC with a length of 8. An RE set occupied on the first group of OFDM symbols in the frequency domain is (0, 1, 2, 3, 4, 5, 6, 7, 8, 9, 10, 11) on an OFDM symbol 1 and an OFDM symbol 2, an RE set occupied on the second group of OFDM symbols in the frequency domain is (0, 1, 2, 3, 8, 9, 10, 11) on an OFDM symbol 5 and an OFDM symbol 6, and an RE set occupied on a third group of OFDM symbols in the frequency domain is (4, 5, 6, 7) on an OFDM symbol 5 and an OFDM symbol 6.

Figure 12:
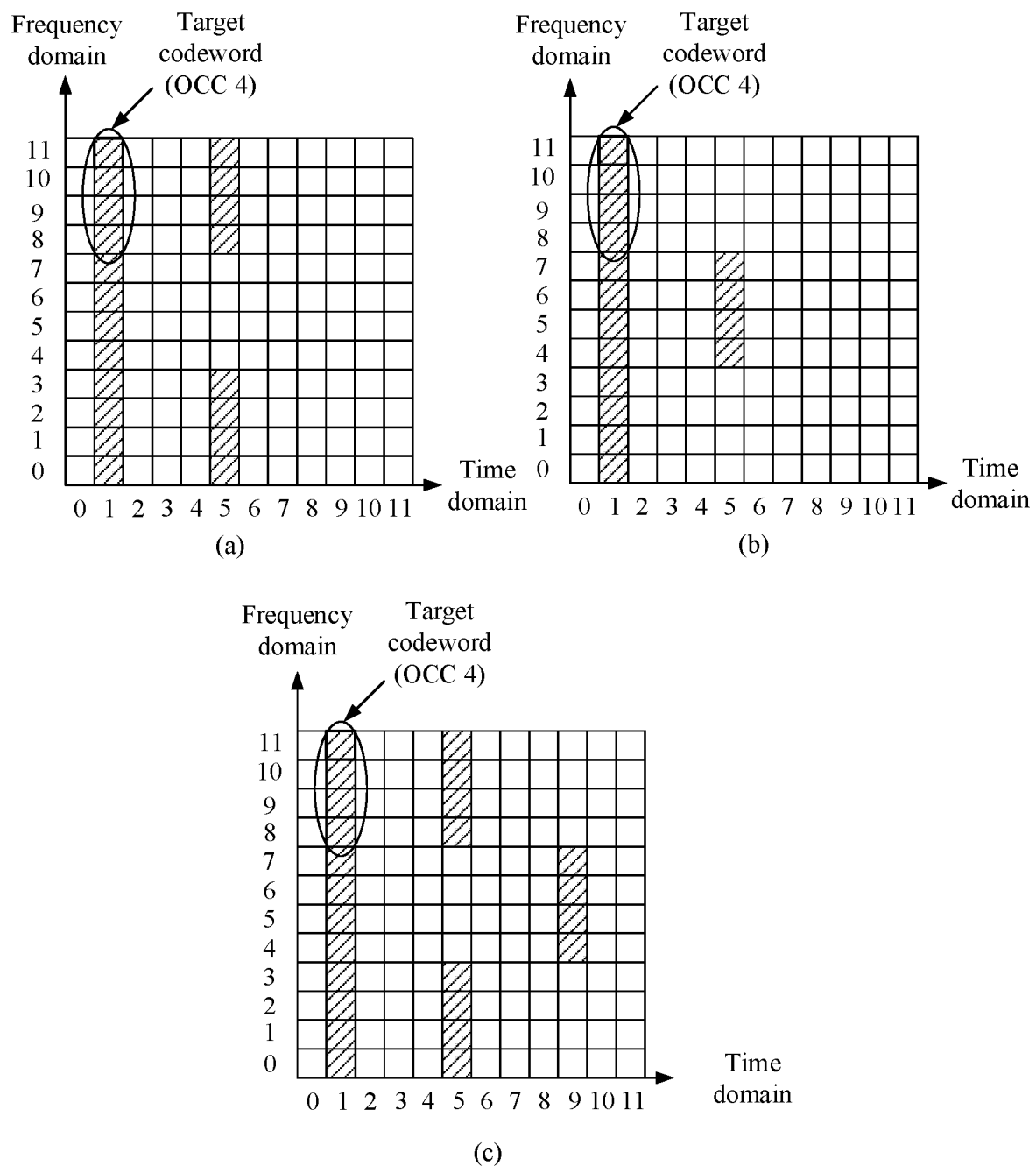
FIG. 12 is another schematic diagram of a demodulation pilot pattern according to an embodiment of this disclosure.

In another implementation, when the RI is equal to 3 or 4, an orthogonal code pattern of a demodulation pilot pattern in the demodulation pilot pattern set includes the following:

(1) Frequency domain code division multiplexing is performed on each OFDM symbol by using an orthogonal code with a length of 4, where each group of OFDM symbols includes one OFDM symbol, as shown in FIG. 12.

Figure 13:
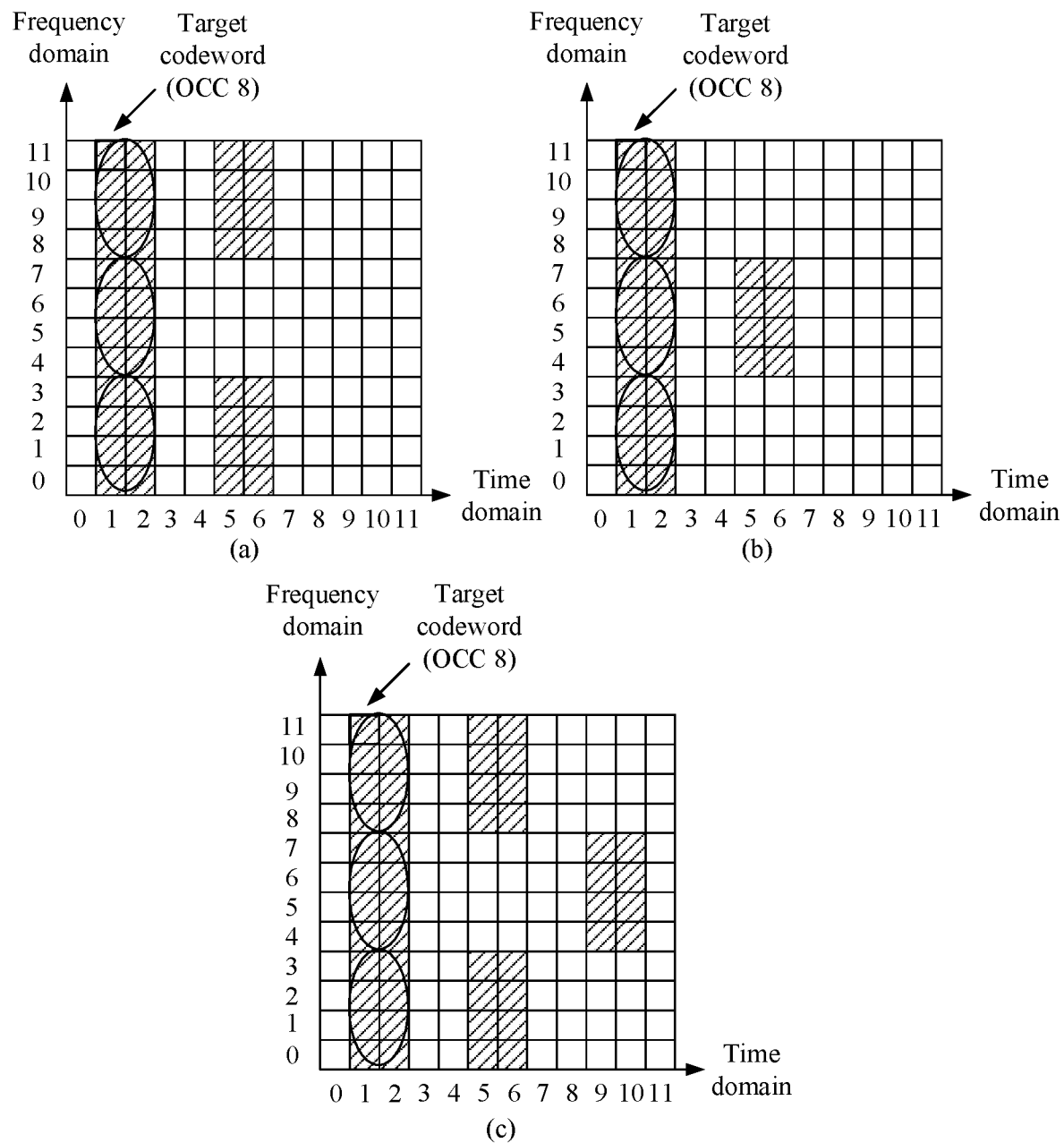
FIG. 13 is another schematic diagram of a demodulation pilot pattern according to an embodiment of this disclosure.

(2) Frequency domain and time domain code division multiplexing is performed on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain, as shown in FIG. 13.

In another implementation, when the RI belongs to a set {5, 6, 7, 8}, an orthogonal code pattern of a demodulation pilot pattern in the demodulation pilot pattern set includes the following:

Frequency domain and time domain code division multiplexing is performed on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain, as shown in FIG. 13.

In actual applications, the target demodulation pilot pattern determined from demodulation pilot patterns in the demodulation pilot pattern set corresponding to the RI may further include but is not limited to the following several possible features:

In an implementation, an OFDM symbol set occupied by the target demodulation pilot pattern includes N groups of OFDM symbols, in an order of time domain locations from front to back, a quantity of REs occupied by the target demodulation pilot pattern on at least one OFDM symbol in the OFDM symbol set is less than a quantity of REs occupied by the target demodulation pilot pattern on a first group of OFDM symbols in the OFDM symbol set, and each group of OFDM symbols in the OFDM symbol set includes at least one OFDM symbol, where N is a positive integer. If the OFDM symbol set includes two groups of OFDM symbols, as shown in FIG. 14(a), an RE set occupied on the first group of OFDM symbols in the frequency domain is (2, 3, 6, 7, 10, 11), and an RE set occupied on the second group of OFDM symbols in the frequency domain is (2, 3, 10, 11). For example, in this embodiment, quantities of REs occupied by the target demodulation pilot pattern on groups of OFDM symbols in the OFDM symbol set may successively decrease in an order of time domain locations from front to back that are of the groups of OFDM symbols in the OFDM symbol set. For example, if the target demodulation pilot pattern includes three groups of OFDM symbols in the OFDM symbol set, a quantity of REs occupied by the target demodulation pilot pattern on a second group of OFDM symbols in the OFDM symbol set is less than a quantity of REs occupied by the target demodulation pilot pattern on a first group of OFDM symbols in the OFDM symbol set, and then a quantity of REs occupied by the target demodulation pilot pattern on a third group of OFDM symbols in the OFDM symbol set is less than the quantity of REs occupied by the target demodulation pilot pattern on the second group of OFDM symbols in the OFDM symbol set. In addition, only the quantities of REs occupied by the target demodulation pilot pattern on the groups of OFDM symbols in the OFDM symbol set may be less than the quantity of REs occupied by the target demodulation pilot pattern on the first group of OFDM symbols in the OFDM symbol set. A specific setting manner is not limited herein. As shown in FIG. 14(b), an RE set occupied on the first group of OFDM symbols in the frequency domain is (2, 3, 6, 7, 10, 11), an RE set occupied on the second group of OFDM symbols in the frequency domain is (2, 3, 10, 11), and an RE set occupied on the third group of OFDM symbols in the frequency domain is (6, 7). Based on this, it can be learned that in the demodulation pilot pattern, only a quantity of REs occupied on the third group of OFDM symbols in the frequency domain may be less than a quantity of REs occupied on the first group of OFDM symbols in the frequency domain. Certainly, the demodulation pilot pattern may also be shown in FIG. 11. A quantity of REs occupied on the first group of OFDM symbols in the frequency domain is greater than a quantity of REs occupied on the second group of OFDM symbols in the frequency domain, and a quantity of REs occupied on the second group of OFDM symbols in the frequency domain is greater than a quantity of REs occupied on the third group of OFDM symbols in the frequency domain. A specific manner is not limited herein.

Figure 11:
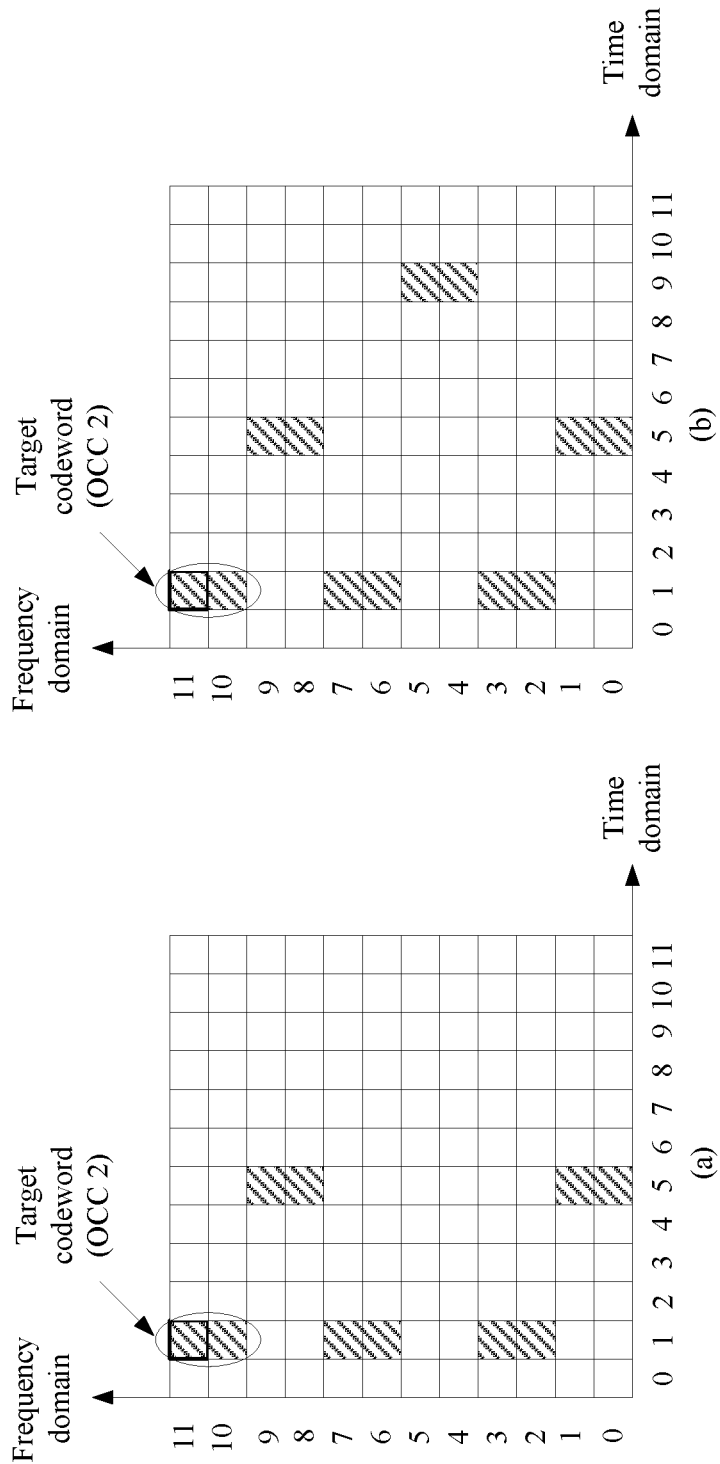
FIG. 11 is another schematic diagram of a demodulation pilot pattern according to an embodiment of this disclosure.
Figure 14:
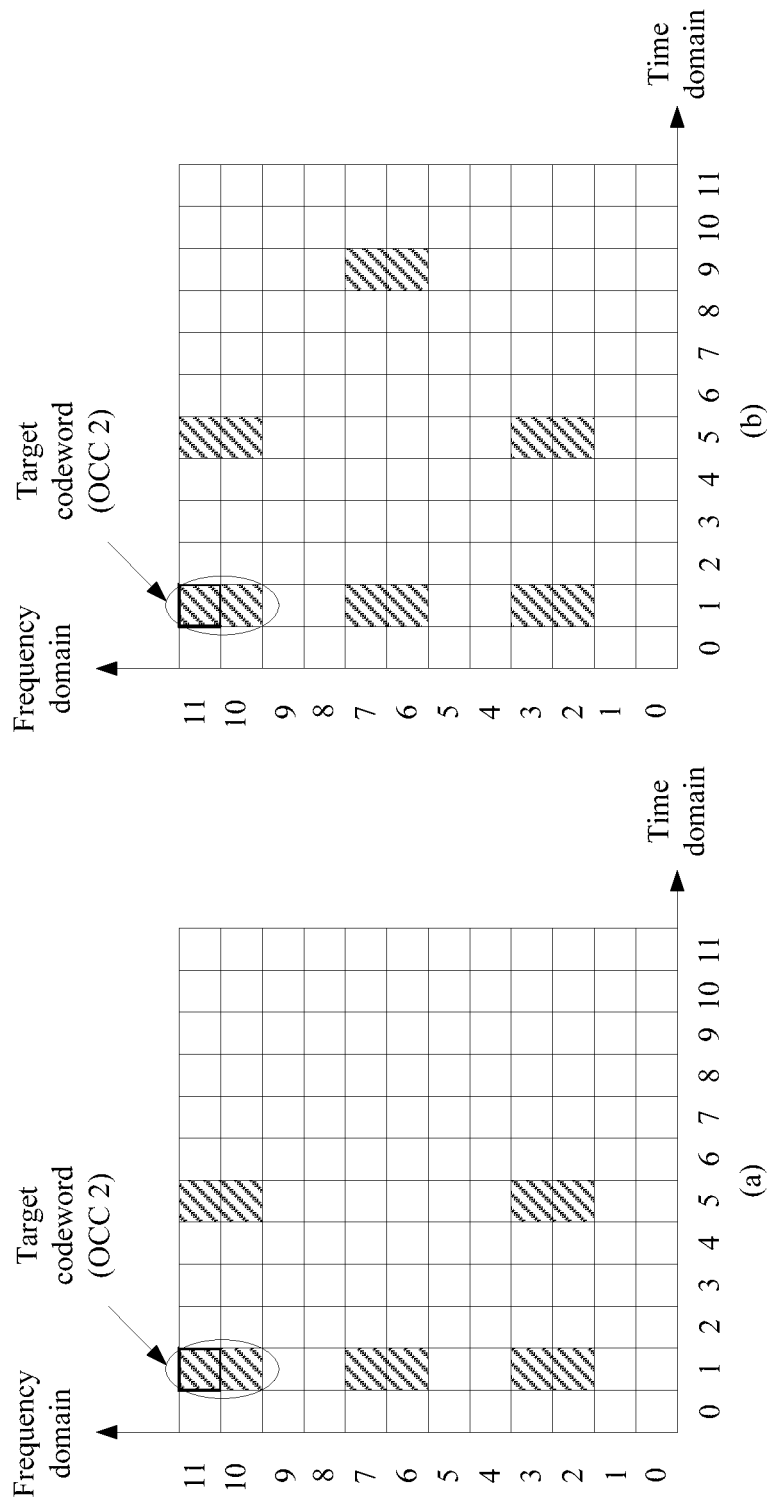
FIG. 14 is another schematic diagram of a demodulation pilot pattern according to an embodiment of this disclosure.

In another implementation, an intersection of an RE set occupied by the target demodulation pilot pattern on at least one group of OFDM symbols in the OFDM symbol set and an RE set occupied by the target demodulation pilot pattern on the first group of OFDM symbols in the OFDM symbol set is an empty set. Alternatively, an RE set occupied by the target demodulation pilot pattern on at least one group of OFDM symbols in the OFDM symbol set is a proper subset of an RE set occupied by the target demodulation pilot pattern on the first group of OFDM symbols in the OFDM symbol set. In actual applications, an RE occupied by the target demodulation pilot pattern on each group of OFDM symbols in the OFDM symbol set is not empty. In addition, an RE occupied by the target demodulation pilot pattern on a current group of OFDM symbols in the OFDM symbol set may be a proper subset of an RE set occupied by the target demodulation pilot pattern on a previous group of OFDM symbols in the OFDM symbol set or an intersection of an RE occupied by the target demodulation pilot pattern on a current group of OFDM symbols in the OFDM symbol set and an RE set occupied by the target demodulation pilot pattern on a previous group of OFDM symbols in the OFDM symbol set may be an empty set. For example, an RE set occupied by the target demodulation pilot pattern on a second group of OFDM symbols in the OFDM symbol set is a proper subset of an RE set occupied by the target demodulation pilot pattern on a first group of OFDM symbols in the OFDM symbol set, and then an RE set occupied by the target demodulation pilot pattern on a third group of OFDM symbols in the OFDM symbol set is a proper subset of the RE set occupied by the target demodulation pilot pattern on the second group of OFDM symbols in the OFDM symbol set. Alternatively, an intersection of an RE set occupied by the target demodulation pilot pattern on a second group of OFDM symbols in the OFDM symbol set and an RE set occupied by the target demodulation pilot pattern on a first group of OFDM symbols in the OFDM symbol set is an empty set, and then an intersection of an RE set occupied by the target demodulation pilot pattern on a third group of OFDM symbols in the OFDM symbol set and the RE set occupied by the target demodulation pilot pattern on the second group of OFDM symbols in the OFDM symbol set is an empty set. As shown in FIG. 11, an RE set occupied on the first group of OFDM symbols in the frequency domain is (2, 3, 6, 7, 10, 11), an RE set occupied on the second group of OFDM symbols in the frequency domain is (0, 1, 8, 9), and an RE set occupied on the third group of OFDM symbols in the frequency domain is (4, 5). To be specific, an intersection of the RE set occupied on the first group of OFDM symbols in the frequency domain and the RE set occupied on the second group of OFDM symbols in the frequency domain is an empty set, and an intersection of the RE set occupied on the third group of OFDM symbols in the frequency domain and the RE set occupied on the second group of OFDM symbols in the frequency domain is an empty set. In addition, as shown in FIG. 14, an RE set occupied on the first group of OFDM symbols in the frequency domain is (2, 3, 6, 7, 10, 11), an RE set occupied on the second group of OFDM symbols in the frequency domain is (2, 3, 6, 7, 10, 11), and an RE set occupied on the third group of OFDM symbols in the frequency domain is (6, 7). To be specific, the RE set occupied on the third group of OFDM symbols in the frequency domain is a proper subset of the RE set occupied on the first group of OFDM symbols in the frequency domain.

1002. The base station maps a pilot signal to a time-frequency resource based on the target demodulation pilot pattern, and sends the pilot signal, the RI, and the pilot configuration information to a receiving device.

The base station maps the to-be-sent pilot signal to the time-frequency resource based on the target demodulation pilot pattern, and then sends the pilot signal to the receiving device in a network, and also sends the RI and the pilot configuration information to the receiving device.

In this embodiment, the receiving device may be a mobile terminal, or may be another network element in the network. A specific form is not limited herein.

1003. The receiving device receives the pilot signal based on the target demodulation pilot pattern.

Before receiving the pilot signal, the receiving device obtains the RI and the pilot configuration information and then obtains the target demodulation pilot pattern based on the RI and the pilot configuration information, and then the receiving device receives, based on the demodulation pilot pattern and related indication information, the pilot signal sent by the base station.

In this embodiment, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that a quantity of users performing multiplexing can be increased.

The foregoing describes the data processing methods in the embodiments of this disclosure. The following describes a base station and a receiving device in embodiments of this disclosure.

Figure 15:
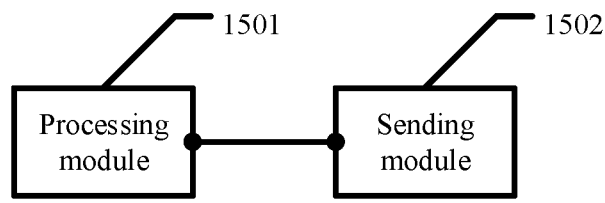
FIG. 15 is a schematic diagram of an embodiment of a base station according to an embodiment of this disclosure.

For details, refer to FIG. 15. An embodiment of a base station according to an embodiment of this disclosure includes:

a processing module 1501, configured to obtain a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword; and a sending module 1502, configured to: map a pilot signal to a time-frequency resource based on the pilot pattern, and send the pilot signal, where a transmission time of a first OFDM symbol in the first set is before a transmission time of a first OFDM symbol in the second set, and the first OFDM symbol in the first set is an OFDM symbol with an earliest transmission time in the first set.

In an embodiment, a quantity of time-frequency resource elements REs on the first OFDM symbol in the first set is greater than a quantity of REs on the first OFDM symbol in the second set.

In an embodiment, a quantity of REs on at least one OFDM symbol in the first set is less than a quantity of REs on the first OFDM symbol in the first set.

In an embodiment, an RE set on the at least one OFDM symbol in the first set is a proper subset of an RE set on the first OFDM symbol in the first set. Alternatively, an intersection of an RE set on the at least one OFDM symbol in the first set and an RE set on the first OFDM symbol in the first set is an empty set.

In an embodiment, a quantity of REs on at least one OFDM symbol in the second set is less than a quantity of REs on the first OFDM symbol in the second set.

In an embodiment, an RE set on the at least one OFDM symbol in the second set is a proper subset of an RE set on the first OFDM symbol in the second set; or an intersection of an RE set on the at least one OFDM symbol in the second set and an RE set on the first OFDM symbol in the second set is an empty set.

In an embodiment, a quantity of REs on at least one OFDM symbol in the second set is greater than a quantity of REs on the first OFDM symbol in the second set.

In an embodiment, the sending module 1502 is further configured to send pilot configuration information, where the pilot configuration information is used to indicate that quantities of REs on OFDM symbols increase or decrease in ascending order of transmission times of the OFDM symbols in the second set.

In an embodiment, the first demodulation pilot pattern indicates that frequency domain code division multiplexing is performed on each OFDM symbol in the first set by using an orthogonal code with a length of 4.

The second demodulation pilot pattern indicates that frequency domain code division multiplexing is performed on each OFDM symbol in the second set by using an orthogonal code with a length of 4.

In this embodiment, when the base station sends the pilot signal by using the time-frequency resource, the transmission time of the first OFDM symbol in the first set is before the transmission time of the first OFDM symbol in the second set. To be specific, in an entire pilot signal transmission process, a receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

Figure 16:
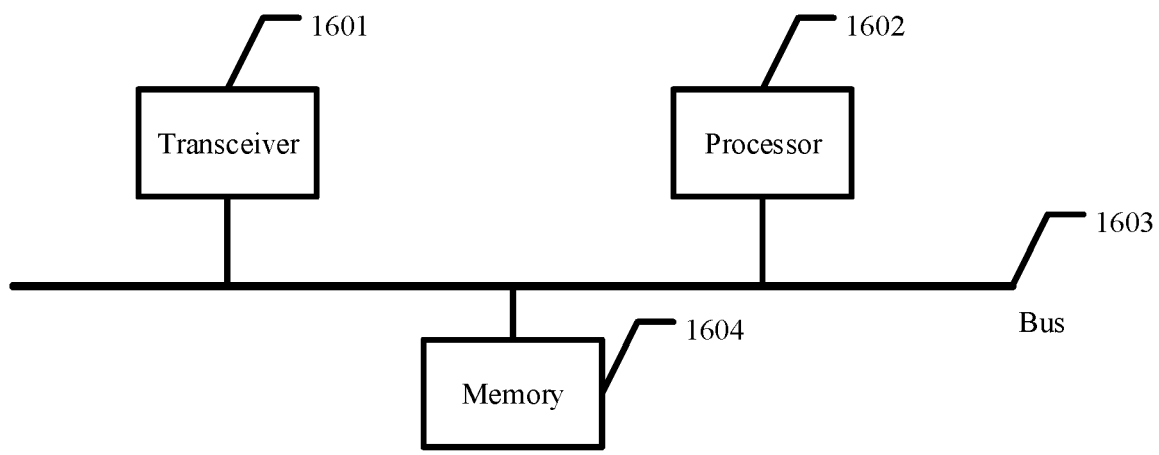
FIG. 16 is a schematic diagram of another embodiment of a base station according to an embodiment of this disclosure.

For details, refer to FIG. 16. Another embodiment of a base station according to an embodiment of this disclosure includes:

a transceiver 1601, a processor 1602, and a bus 1603.

The transceiver 1601 is connected to the processor 1602 by using the bus 1603.

The bus 1603 may be a peripheral component interconnect (peripheral component interconnect, PCI for short) bus, an extended industry standard architecture (extended industry standard architecture, EISA for short) bus, or the like.

The bus may be classified into an address bus, a data bus, a control bus, and the like. For ease of representation, only one thick line is used to represent the bus 1603 in FIG. 16, but this does not mean that there is only one bus or only one type of bus.

The processor 1602 may be a central processing unit (central processing unit, CPU for short), a network processor (network processor, NP for short), or a combination of a CPU and an NP.

The processor 1602 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logical device (complex programmable logic device, CPLD for short), a field-programmable logic gate array (field-programmable gate array, FPGA for short), generic array logic (generic array logic, GAL for short), or any combination thereof.

Referring to FIG. 16, the base station may further include a memory 1604. The memory 1604 may include a volatile memory (volatile memory), for example, a random access memory (random-access memory, RAM for short). Alternatively, the memory may include a nonvolatile memory (non-volatile memory), for example, a flash memory (flash memory), a hard disk (hard disk drive, HDD for short), or a solid state drive (solid-state drive, SSD for short). Alternatively, the memory 1604 may include a combination of the foregoing types of memories.

In an embodiment, the memory 1604 may be further configured to store a program instruction. The processor 1602 can perform, by invoking the program instruction stored in the memory 1604, one or more steps or optional implementations in the embodiments shown in FIG. 2 to FIG. 14, to implement a function of performing behavior of the base station in the foregoing method.

The processor 1602 performs the following step:

obtaining a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword.

The transceiver 1601 performs the following steps:

mapping a pilot signal to a time-frequency resource based on the pilot pattern, and sending the pilot signal, where a transmission time of a first OFDM symbol in the first set is before a transmission time of a first OFDM symbol in the second set, and the first OFDM symbol in the first set is an OFDM symbol with an earliest transmission time in the first set.

In this embodiment, the transceiver 1601 further performs all steps of data receiving/transmitting, and the processor further performs all steps of data processing in the foregoing embodiment.

In this embodiment, when the base station sends the pilot signal by using the time-frequency resource, the transmission time of the first OFDM symbol in the first set is before the transmission time of the first OFDM symbol in the second set. To be specific, in an entire pilot signal transmission process, a receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

Figure 17:
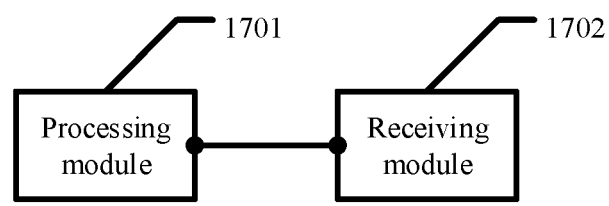
FIG. 17 is a schematic diagram of an embodiment of a receiving device according to an embodiment of this disclosure.

For details, refer to FIG. 17. An embodiment of a receiving device according to an embodiment of this disclosure includes:

a processing module 1701, configured to obtain a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword; and a receiving module 1702, configured to receive a pilot signal based on the demodulation pilot pattern, where the pilot signal is sent by a base station after being mapped by the base station to a time-frequency resource based on the demodulation pilot map; and a transmission time of a first OFDM symbol in the first set is before a transmission time of a first OFDM symbol in the second set, and the first OFDM symbol in the first set is an OFDM symbol with an earliest transmission time in the first set.

In an embodiment, a quantity of time-frequency resource elements REs on the first OFDM symbol in the first set is greater than a quantity of REs on the first OFDM symbol in the second set.

In an embodiment, a quantity of REs on at least one OFDM symbol in the first set is less than a quantity of REs on the first OFDM symbol in the first set.

In an embodiment, an RE set on the at least one OFDM symbol in the first set is a proper subset of an RE set on the first OFDM symbol in the first set; or an intersection of an RE set on the at least one OFDM symbol in the first set and an RE set on the first OFDM symbol in the first set is an empty set.

In an embodiment, a quantity of REs on at least one OFDM symbol in the second set is less than a quantity of REs on the first OFDM symbol in the second set.

In an embodiment, an RE set on the at least one OFDM symbol in the second set is a proper subset of an RE set on the first OFDM symbol in the second set; or an intersection of an RE set on the at least one OFDM symbol in the second set and an RE set on the first OFDM symbol in the second set is an empty set.

In an embodiment, a quantity of REs on at least one OFDM symbol in the second set is greater than a quantity of REs on the first OFDM symbol in the second set.

In an embodiment, the receiving module 1702 is further configured to receive pilot configuration information, where the pilot configuration information is used to indicate that quantities of REs on OFDM symbols increase or decrease in ascending order of transmission times of the OFDM symbols in the second set.

In an embodiment, the first demodulation pilot pattern indicates that frequency domain code division multiplexing is performed on each OFDM symbol in the first set by using an orthogonal code with a length of 4.

The second demodulation pilot pattern indicates that frequency domain code division multiplexing is performed on each OFDM symbol in the second set by using an orthogonal code with a length of 4.

In this embodiment, when the base station sends the pilot signal by using the time-frequency resource, the transmission time of the first OFDM symbol in the first set is before the transmission time of the first OFDM symbol in the second set. To be specific, in an entire pilot signal transmission process, the receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

Figure 18:
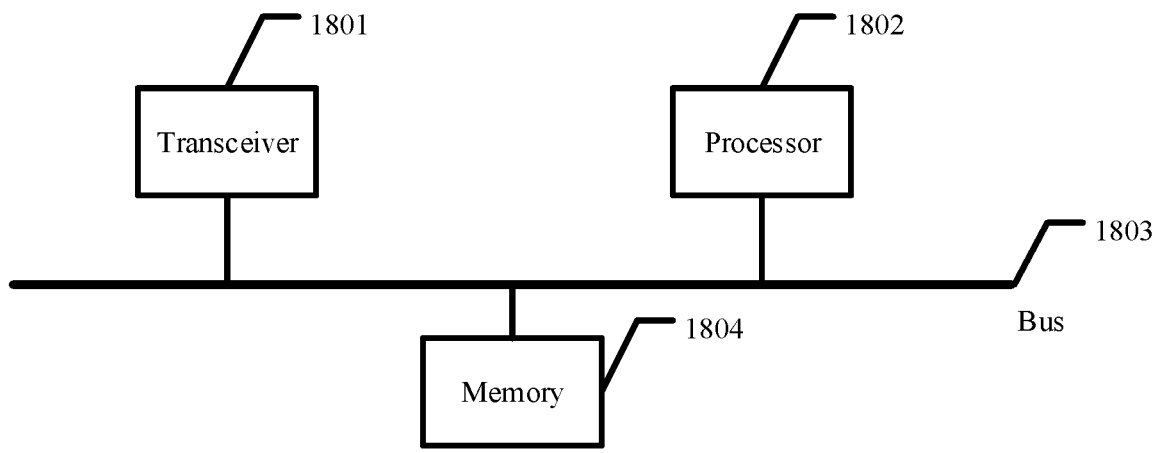
FIG. 18 is a schematic diagram of another embodiment of a receiving device according to an embodiment of this disclosure.

For details, refer to FIG. 18. Another embodiment of a receiving device according to an embodiment of this disclosure includes:

a transceiver 1801, a processor 1802, and a bus 1803.

The transceiver 1801 is connected to the processor 1802 by using the bus 1803.

The bus 1803 may be a PCI bus, an EISA bus, or the like. The bus may be classified into an address bus, a data bus, a control bus, and the like. For ease of representation, only one thick line is used to represent the bus 1803 in FIG. 18, but this does not mean that there is only one bus or only one type of bus.

The processor 1802 may be a CPU, an NP, or a combination of a CPU and an NP.

The processor 1802 may further include a hardware chip. The hardware chip may be an ASIC, a PLD, or a combination thereof. The PLD may be a CPLD, an FPGA, a GAL, or any combination thereof.

Referring to FIG. 18, the receiving device may further include a memory 1804. The memory 1804 may include a volatile memory (volatile memory), for example, a RAM. Alternatively, the memory may include a nonvolatile memory (non-volatile memory), for example, a flash memory (flash memory), an HDD, or an SSD. Alternatively, the memory 1804 may include a combination of the foregoing types of memories.

In an embodiment, the memory 1804 may be further configured to store a program instruction. The processor 1802 can perform, by invoking the program instruction stored in the memory 1804, one or more steps or optional implementations in the embodiments shown in FIG. 2 to FIG. 14, to implement a function of performing behavior of the receiving device in the foregoing method.

The processor 1802 performs the following step: obtaining a demodulation pilot pattern in a transmission time unit, where the demodulation pilot pattern includes a first demodulation pilot pattern of a first codeword and a second demodulation pilot pattern of a second codeword; the first demodulation pilot pattern indicates a time-frequency resource of each orthogonal frequency division multiplexing OFDM symbol in a first set, and the second demodulation pilot pattern indicates a time-frequency resource of each OFDM symbol in a second set; and a modulation and coding MCS indication value of the first codeword is greater than an MCS indication value of the second codeword.

The transceiver 1801 performs the following step:

receiving a pilot signal based on the demodulation pilot pattern, where the pilot signal is sent by a base station after being mapped by the base station to a time-frequency resource based on the demodulation pilot map; and a transmission time of a first OFDM symbol in the first set is before a transmission time of a first OFDM symbol in the second set, and the first OFDM symbol in the first set is an OFDM symbol with an earliest transmission time in the first set.

In this embodiment, the processor 1802 further performs all steps of data processing in the foregoing embodiment, and the transceiver 1801 further performs all steps of data receiving/transmitting in the foregoing embodiment.

In this embodiment, when the base station sends the pilot signal by using the time-frequency resource, the transmission time of the first OFDM symbol in the first set is before the transmission time of the first OFDM symbol in the second set. To be specific, in an entire pilot signal transmission process, the receiving device can immediately start to decode the first codeword after receiving a time-frequency resource of the first codeword, to advance a decoding time of the first codeword, and further advance a decoding time of the second codeword. In addition, because the MCS indication value of the first codeword is greater than the MCS indication value of the second codeword, a decoding success rate of the first codeword is relatively high. Because the second codeword needs to be decoded based on a decoding result of the first codeword, a decoding success rate of the second codeword can be effectively improved due to the relatively high decoding success rate of the first codeword.

Figure 19:
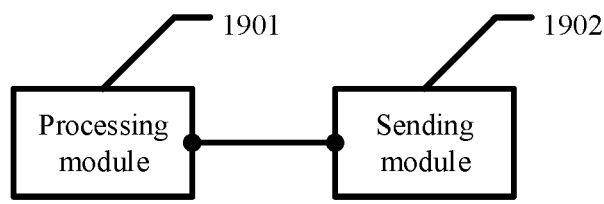
FIG. 19 is a schematic diagram of another embodiment of a base station according to an embodiment of this disclosure.

For details, refer to FIG. 19. Another embodiment of a base station according to an embodiment of this disclosure includes:

a processing module 1901, configured to: determine a rank indication RI and pilot configuration information, and determine, based on the pilot configuration information, a target demodulation pilot pattern in a transmission time unit from a demodulation pilot pattern set corresponding to the RI, where the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and a sending module 1902, configured to: map a pilot signal to a time-frequency resource based on the target pilot pattern, and send the pilot signal, the pilot configuration information, and the RI.

In an embodiment, an OFDM symbol set indicated by the target demodulation pilot pattern includes N groups of OFDM symbols, in an order of time domain locations from front to back that are of the N groups of OFDM symbols, a quantity of REs on at least one OFDM symbol in the OFDM symbol set indicated by the target demodulation pilot pattern is less than a quantity of REs on a first group of OFDM symbols in the OFDM symbol set indicated by the target demodulation pilot pattern, and each group of OFDM symbols in the OFDM symbol set indicated by the target demodulation pilot pattern includes at least one OFDM symbol, where N is a positive integer.

In an embodiment, an intersection of an RE set on at least one group of OFDM symbols in the OFDM symbol set indicated by the target demodulation pilot pattern and an RE set on the first group of OFDM symbols in the OFDM symbol set indicated by the target demodulation pilot pattern is an empty set; or an RE set on at least one group of OFDM symbols in the OFDM symbol set indicated by the target demodulation pilot pattern is a proper subset of an RE set on the first group of OFDM symbols in the OFDM symbol set indicated by the target demodulation pilot pattern.

In an embodiment, when the RI is equal to 1 or 2, an orthogonal code pattern of a demodulation pilot pattern in the demodulation pilot pattern set includes: performing frequency domain code division multiplexing on each group of OFDM symbols by using an orthogonal code with a length of 2, where each group of OFDM symbols includes one OFDM symbol;

performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In an embodiment, when the RI is equal to 3 or 4, an orthogonal code pattern of a demodulation pilot pattern in the demodulation pilot pattern set includes: performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In an embodiment, when the RI belongs to a set {5, 6, 7, 8}, an orthogonal code pattern of a demodulation pilot pattern in the demodulation pilot pattern set includes: performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain; and performing frequency domain code division multiplexing on a first OFDM symbol in each group of OFDM symbols by using an orthogonal code with a length of 4, and performing frequency domain code division multiplexing on a second OFDM symbol in each group of OFDM symbols by using an orthogonal code with a length of 4, where each group of OFDM symbols includes two consecutive OFDM symbols in the time domain.

In this embodiment, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

Figure 20:
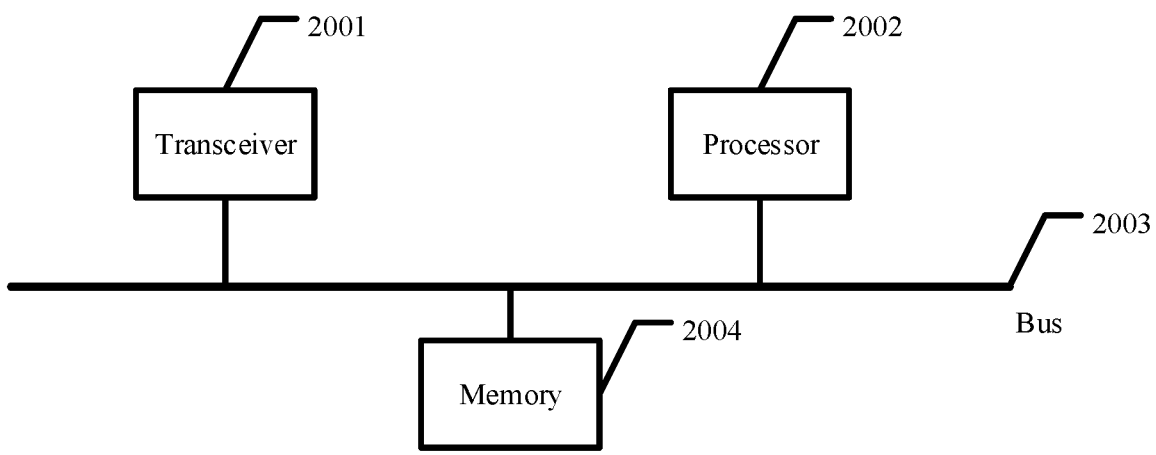
FIG. 20 is a schematic diagram of another embodiment of a base station according to an embodiment of this disclosure.

For details, refer to FIG. 20. Another embodiment of a base station according to an embodiment of this disclosure includes:

a transceiver 2001, a processor 2002, and a bus 2003.

The transceiver 2001 is connected to the processor 2002 by using the bus 2003.

The bus 2003 may be a PCI bus, an EISA bus, or the like. The bus may be classified into an address bus, a data bus, a control bus, and the like. For ease of representation, only one thick line is used to represent the bus 2003 in FIG. 20, but this does not mean that there is only one bus or only one type of bus.

The processor 2002 may be a CPU, an NP, or a combination of a CPU and an NP.

The processor 2002 may further include a hardware chip. The hardware chip may be an ASIC, a PLD, or a combination thereof. The PLD may be a CPLD, an FPGA, a GAL, or any combination thereof.

Referring to FIG. 20, the base station may further include a memory 2004. The memory 2004 may include a volatile memory (volatile memory), for example, a RAM. Alternatively, the memory may include a nonvolatile memory (non-volatile memory), for example, a flash memory (flash memory), an HDD, or an SSD. Alternatively, the memory 2004 may include a combination of the foregoing types of memories.

In an embodiment, the memory 2004 may be further configured to store a program instruction. The processor 2002 can perform, by invoking the program instruction stored in the memory 2004, one or more steps or optional implementations in the embodiments shown in FIG. 2 to FIG. 14, to implement a function of performing behavior of the base station in the foregoing method.

The processor 2002 performs the following steps: determining a rank indication RI and pilot configuration information, and determining, based on the pilot configuration information, a target demodulation pilot pattern in a transmission time unit from a demodulation pilot pattern set corresponding to the RI, where the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type.

The transceiver 2001 performs the following steps:

mapping a pilot signal to a time-frequency resource based on the target pilot pattern, and sending the pilot signal, the pilot configuration information, and the RI. In this embodiment, the transceiver 2001 further performs all steps of data receiving/transmitting in the foregoing embodiment, and the processor 2002 further performs all steps of data processing in the foregoing embodiment.

In this embodiment, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

Figure 21:
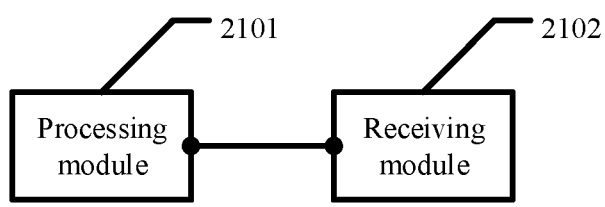
FIG. 21 is a schematic diagram of another embodiment of a receiving device according to an embodiment of this disclosure.

For details, refer to FIG. 21. Another embodiment of a receiving device according to an embodiment of this disclosure includes:

a processing module 2101, configured to obtain a target demodulation pilot pattern in a transmission time unit, where the target demodulation pilot map is determined, based on pilot configuration information, by a base station from a demodulation pilot pattern set corresponding to a rank indication RI; the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type; and a receiving module 2102, configured to receive a pilot signal based on the target demodulation pilot pattern, where the pilot signal is sent by the base station after being mapped by the base station to a time-frequency resource based on the target demodulation pilot pattern.

In an embodiment, an OFDM symbol set indicated by the target demodulation pilot pattern includes N groups of OFDM symbols, in an order of time domain locations from front to back that are of the N groups of OFDM symbols, a quantity of REs on at least one OFDM symbol in the OFDM symbol set indicated by the target demodulation pilot pattern is less than a quantity of REs on a first group of OFDM symbols in the OFDM symbol set indicated by the target demodulation pilot pattern, and each group of OFDM symbols in the OFDM symbol set indicated by the target demodulation pilot pattern includes at least one OFDM symbol, where N is a positive integer.

In an embodiment, an intersection of an RE set on at least one group of OFDM symbols in the OFDM symbol set indicated by the target demodulation pilot pattern and an RE set on the first group of OFDM symbols in the OFDM symbol set indicated by the target demodulation pilot pattern is an empty set; or an RE set on at least one group of OFDM symbols in the OFDM symbol set indicated by the target demodulation pilot pattern is a proper subset of an RE set on the first group of OFDM symbols in the OFDM symbol set indicated by the target demodulation pilot pattern.

In an embodiment, when the RI is equal to 1 or 2, an orthogonal code pattern of a demodulation pilot pattern in the demodulation pilot pattern set includes: performing frequency domain code division multiplexing on each group of OFDM symbols by using an orthogonal code with a length of 2, where each group of OFDM symbols includes one OFDM symbol;

performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In an embodiment, when the RI is equal to 3 or 4, an orthogonal code pattern of a demodulation pilot pattern in the demodulation pilot pattern set includes: performing frequency domain code division multiplexing on each group of OFDM symbols by using an orthogonal code with a length of 4, where each group of OFDM symbols includes one OFDM symbol; and performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain.

In an embodiment, when the RI belongs to a set {5, 6, 7, 8}, an orthogonal code pattern of a demodulation pilot pattern in the demodulation pilot pattern set includes: performing frequency domain and time domain code division multiplexing on each group of OFDM symbols by using an orthogonal code with a length of 8, where the frequency domain code division multiplexing has a length of 4, the time domain code division multiplexing has a length of 2, and each group of OFDM symbols includes two consecutive OFDM symbols in the time domain; and performing frequency domain code division multiplexing on a first OFDM symbol in each group of OFDM symbols by using an orthogonal code with a length of 4, and performing frequency domain code division multiplexing on a second OFDM symbol in each group of OFDM symbols by using an orthogonal code with a length of 4, where each group of OFDM symbols includes two consecutive OFDM symbols in the time domain.

In this embodiment, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

Figure 22:
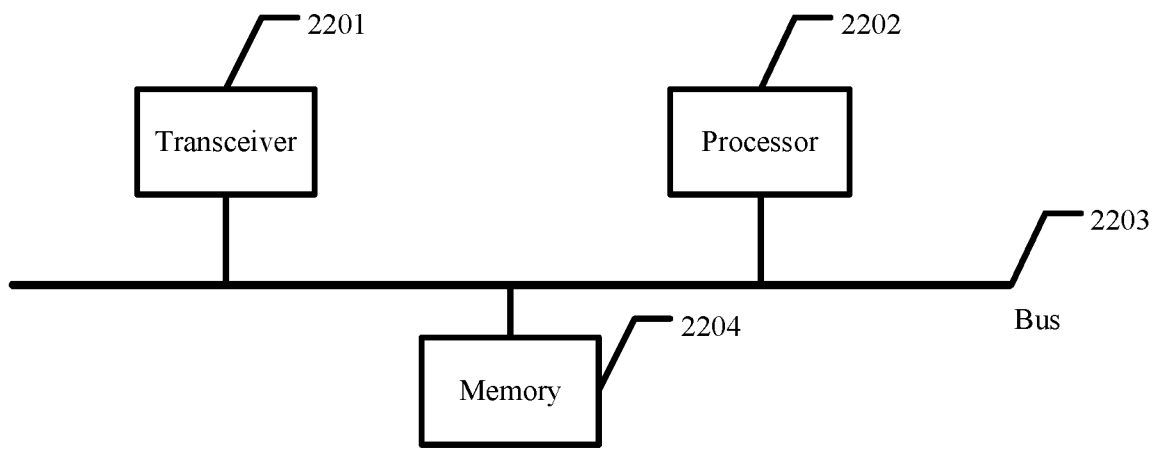
FIG. 22 is a schematic diagram of another embodiment of a receiving device according to an embodiment of this disclosure.

For details, refer to FIG. 22. Another embodiment of a receiving device according to an embodiment of this disclosure includes:

a transceiver 2201, a processor 2202, and a bus 2203.

The transceiver 2201 is connected to the processor 2202 by using the bus 2203.

The bus 2203 may be a PCI bus, an EISA bus, or the like. The bus may be classified into an address bus, a data bus, a control bus, and the like. For ease of representation, only one thick line is used to represent the bus 2203 in FIG. 22, but this does not mean that there is only one bus or only one type of bus.

The processor 2202 may be a CPU, an NP, or a combination of a CPU and an NP.

The processor 2202 may further include a hardware chip. The hardware chip may be an ASIC, a PLD, or a combination thereof. The PLD may be a CPLD, an FPGA, a GAL, or any combination thereof.

Referring to FIG. 22, the receiving device may further include a memory 2204. The memory 2204 may include a volatile memory (volatile memory), for example, a RAM. Alternatively, the memory may include a nonvolatile memory (non-volatile memory), for example, a flash memory (flash memory), an HDD, or an SSD. Alternatively, the memory 2204 may include a combination of the foregoing types of memories.

In an embodiment, the memory 2204 may be further configured to store a program instruction. The processor 2202 can perform, by invoking the program instruction stored in the memory 2204, one or more steps or optional implementations in the embodiments shown in FIG. 2 to FIG. 14, to implement a function of performing behavior of the receiving device in the foregoing method.

The processor 2202 performs the following step:

obtaining a target demodulation pilot pattern in a transmission time unit, where the target demodulation pilot map is determined, based on pilot configuration information, by a base station from a demodulation pilot pattern set corresponding to a rank indication RI; the demodulation pilot pattern set includes at least two demodulation pilot patterns; each demodulation pilot pattern in the demodulation pilot pattern set indicates a time-frequency resource of each orthogonal frequency division multiplexing OFDM symbol in an OFDM symbol set, quantities of time-frequency resource elements REs on OFDM symbols indicated by demodulation pilot patterns in the demodulation pilot pattern set are different, and orthogonal code patterns used by the demodulation pilot patterns in the demodulation pilot pattern set are different; the orthogonal code patterns include a one-dimensional frequency domain spread spectrum pattern and a two-dimensional time-frequency spread spectrum pattern; and the at least two demodulation pilot patterns are demodulation pilot patterns in a same subframe type.

The transceiver 2201 performs the following step:

receiving a pilot signal based on the target demodulation pilot pattern, where the pilot signal is sent by the base station after being mapped by the base station to a time-frequency resource based on the target demodulation pilot pattern.

In this embodiment, the transceiver 2201 further performs all steps of data receiving/transmitting in the foregoing embodiment, and the processor 2202 further performs all steps of data processing in the foregoing embodiment.

In this embodiment, the demodulation pilot patterns included in the demodulation pilot pattern set corresponding to the RI use the orthogonal code patterns: the one-dimensional frequency domain spread spectrum pattern and the two-dimensional time-frequency spread spectrum pattern, so that a spread spectrum gain can be effectively increased, to improve data detection performance. In addition, the quantities of REs occupied by the demodulation pilot patterns in the demodulation pilot pattern set corresponding to the RI are different, so that channel estimation performance can be ensured when a quantity of users performing multiplexing is increased.

It may be clearly understood by persons skilled in the art that for the purpose of convenient and brief description, for a detailed working process of the foregoing described system, apparatus, and unit, refer to a corresponding process in the foregoing method embodiments. Details are not described herein again.

In the several embodiments provided in this disclosure, it should be understood that the disclosed system, apparatus, and method may be implemented in another manner. For example, the foregoing described apparatus embodiment is merely an example. For example, the unit division is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this disclosure may be integrated into one processing unit, or each of the units may exist alone physically, or two or more units are integrated into one unit. The integrated unit may be implemented in a form of hardware, or may be implemented in a form of a software function unit.

If the integrated unit is implemented in the form of a software function unit and sold or used as an independent product, the integrated unit may be stored in a computer readable storage medium. Based on such an understanding, the technical solutions of this disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in the embodiments of this disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A data processing method, comprising:
   obtaining, by a base station, a demodulation pilot pattern in a transmission time unit, wherein the demodulation pilot pattern comprises a first demodulation pilot pattern of a first codeword and a second demodulation pilot pattern of a second codeword; the first demodulation pilot pattern indicates a time-frequency resource of each orthogonal frequency division multiplexing (OFDM) symbol in a first set, and the second demodulation pilot pattern indicates a time-frequency resource of each OFDM symbol in a second set; and a modulation and coding scheme (MCS) indication value of the first codeword is greater than an MCS indication value of the second codeword; and
   mapping, by the base station, a pilot signal to a time-frequency resource based on the demodulation pilot pattern; and
   sending, by the base station, the pilot signal to a receiving device, wherein a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

2. The method according to claim 1, wherein a quantity of time-frequency resource elements (REs) on the first OFDM symbol in the first set is greater than a quantity of REs on the first OFDM symbol in the second set.

3. The method according to claim 1, wherein a quantity of time-frequency resource elements (REs) on at least one OFDM symbol in the first set is less than a quantity of REs on the first OFDM symbol in the first set.

4. The method according to claim 3, wherein a resource element (RE) set on the at least one OFDM symbol in the first set is a subset of an RE set on the first OFDM symbol in the first set; or
an intersection of an RE set on the at least one OFDM symbol in the first set and an RE set on the first OFDM symbol in the first set is an empty set.

5. The method according to claim 1, wherein a quantity of REs on at least one OFDM symbol in the second set is less than a quantity of REs on the first OFDM symbol in the second set.

6. The method according to claim 5, wherein an RE set on the at least one OFDM symbol in the second set is a subset of an RE set on the first OFDM symbol in the second set; or
an intersection of an RE set on the at least one OFDM symbol in the second set and an RE set on the first OFDM symbol in the second set is an empty set.

7. The method according to claim 1, wherein a quantity of REs on at least one OFDM symbol in the second set is greater than a quantity of REs on the first OFDM symbol in the second set.

8. The method according to claim 5, further comprising:
sending, by the base station, pilot configuration information, wherein the pilot configuration information is configured to indicate an increase or decrease of quantities of REs on OFDM symbols in ascending order of transmission times of the OFDM symbols in the second set.

9. The method according to claim 1, wherein the first demodulation pilot pattern indicates that frequency domain code division multiplexing is performed on each OFDM symbol in the first set by using an orthogonal code with a length of 4; and
the second demodulation pilot pattern indicates that frequency domain code division multiplexing is performed on each OFDM symbol in the second set by using an orthogonal code with a length of 4.

10. A data processing method, comprising:
obtaining, by a receiving device, a demodulation pilot pattern in a transmission time unit, wherein the demodulation pilot pattern comprises a first demodulation pilot pattern of a first codeword and a second demodulation pilot pattern of a second codeword; the first demodulation pilot pattern indicates a time-frequency resource of each OFDM symbol in a first set, and the second demodulation pilot pattern indicates a time-frequency resource of each OFDM symbol in a second set; and a modulation and coding scheme (MCS) indication value of the first codeword is greater than an MCS indication value of the second codeword; and
receiving, by the receiving device, a pilot signal based on the demodulation pilot pattern, wherein the pilot signal is sent by a base station after being mapped by the base station to a time-frequency resource based on a demodulation pilot map; and a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

11. The method according to claim 10, wherein a quantity of time-frequency resource elements REs on the first OFDM symbol in the first set is greater than a quantity of REs on the first OFDM symbol in the second set.

12. The method according to claim 10, wherein a quantity of REs on at least one OFDM symbol in the first set is less than a quantity of REs on the first OFDM symbol in the first set.

13. The method according to claim 12, wherein an RE set on the at least one OFDM symbol in the first set is a proper subset of an RE set on the first OFDM symbol in the first set; or
an intersection of an RE set on the at least one OFDM symbol in the first set and an RE set on the first OFDM symbol in the first set is an empty set.

14. The method according to claim 10, wherein a quantity of REs on at least one OFDM symbol in the second set is less than a quantity of REs on the first OFDM symbol in the second set.

15. The method according to claim 14, wherein an RE set on the at least one OFDM symbol in the second set is a proper subset of an RE set on the first OFDM symbol in the second set; or
an intersection of an RE set on the at least one OFDM symbol in the second set and an RE set on the first OFDM symbol in the second set is an empty set.

16. The method according to claim 10, wherein a quantity of REs on at least one OFDM symbol in the second set is greater than a quantity of REs on the first OFDM symbol in the second set.

17. The method according to claim 14, further comprising:
receiving, by the receiving device, pilot configuration information, wherein the pilot configuration information is configured to indicate an increase or decrease of quantities of REs on OFDM symbols in ascending order of transmission times of the OFDM symbols in the second set.

18. The method according to claim 10, wherein the first demodulation pilot pattern indicates that frequency domain code division multiplexing is performed on each OFDM symbol in the first set by using an orthogonal code with a length of 4; and
the second demodulation pilot pattern indicates that frequency domain code division multiplexing is performed on each OFDM symbol in the second set by using an orthogonal code with a length of 4.

19. A base station, comprising:
a processor configured to obtain a demodulation pilot pattern in a transmission time unit, wherein the demodulation pilot pattern comprises a first demodulation pilot pattern of a first codeword and a second demodulation pilot pattern of a second codeword, the first demodulation pilot pattern indicates a time-frequency resource of each orthogonal frequency division multiplexing (OFDM) symbol in a first set, and the second demodulation pilot pattern indicates a time-frequency resource of each OFDM symbol in a second set, and a modulation and coding scheme (MCS) indication value of the first codeword is greater than an MCS indication value of the second codeword; and
a transceiver configured to:
map a pilot signal to a time-frequency resource based on the demodulation pilot pattern, and
send the pilot signal to a receiving device, wherein a transmission time of a first OFDM symbol in the first set is before a transmission time of a first OFDM symbol in the second set, the first OFDM symbol in the first set is an OFDM symbol with an earliest transmission time in the first set, and the first OFDM symbol in the second set is an OFDM symbol with an earliest transmission time in the second set.

20. The base station according to claim 19, wherein a quantity of time-frequency resource elements REs on the first OFDM symbol in the first set is greater than a quantity of REs on the first OFDM symbol in the second set.

\* \* \* \* \*